US010610812B2

(12) United States Patent
Izzi et al.

(10) Patent No.: US 10,610,812 B2
(45) Date of Patent: *Apr. 7, 2020

(54) FILTER MEDIA PACK, FILTER ASSEMBLY, AND METHOD

(71) Applicant: Donaldson Company, Inc., Minneapolis, MN (US)

(72) Inventors: Giancarlo Izzi, Minneapolis, MN (US); Robert M. Rogers, Minnetonka, MN (US); Brad E. Kahlbaugh, Bloomington, MN (US); Timothy O. Winters, Nowthen, MN (US); Keith Alderson, Minneapolis, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/167,114

(22) Filed: Oct. 22, 2018

(65) Prior Publication Data
US 2019/0054405 A1 Feb. 21, 2019

Related U.S. Application Data

(63) Continuation of application No. 13/979,796, filed as application No. PCT/US2012/023860 on Feb. 3, 2012, now Pat. No. 10,105,624.
(Continued)

(51) Int. Cl.
*B01D 39/20* (2006.01)
*B01D 46/00* (2006.01)
(Continued)

(52) U.S. Cl.
CPC ..... *B01D 39/1623* (2013.01); *B01D 39/2017* (2013.01); *B01D 46/0082* (2013.01);
(Continued)

(58) Field of Classification Search
CPC ............ B01D 39/20; B01D 39/1623; B01D 39/2017; B01D 46/00; B01D 46/0082;
(Continued)

(56) References Cited

U.S. PATENT DOCUMENTS 3,338,992 A 8/1967 Allison et al.
3,341,394 A 9/1967 Kinney
(Continued)

FOREIGN PATENT DOCUMENTS

CN 101652168 2/2010
CN 103347585 10/2013
(Continued)

OTHER PUBLICATIONS

File History for European Patent Application No. 12706731.2 downloaded Nov. 12, 2018 (291 pages).
(Continued)

*Primary Examiner* — Minh Chau T Pham
(74) *Attorney, Agent, or Firm* — Pauly, DeVries Smith & Deffner

(57) ABSTRACT

Disclosed are filter media packs having a single layer of a high loft filter media and a single layer of a low loft filter media, the filter media pack characterized by the absence of oil added to the filter media pack, the filter media pack capable of filtering air laden particulates from an air stream at greater than 94% efficiency at air stream flow rates of between about 100 feet per minute and 3000 feet per minute. Also disclosed are filter assemblies formed from the filter media pack, and methods of using the filter assemblies.

20 Claims, 3 Drawing Sheets

Related U.S. Application Data

(60) Provisional application No. 61/439,218, filed on Feb. 3, 2011.

(51) Int. Cl.
| | | |
|---|---|---|
| *B23B 5/08* | (2006.01) | |
| *B23B 5/26* | (2006.01) | |
| *B01D 39/16* | (2006.01) | |
| *B32B 5/02* | (2006.01) | |
| *B32B 5/08* | (2006.01) | |
| *B32B 5/26* | (2006.01) | |

(52) U.S. Cl.
CPC ............. *B32B 5/022* (2013.01); *B32B 5/08* (2013.01); *B32B 5/26* (2013.01); *B01D 2239/0216* (2013.01); *B01D 2239/0233* (2013.01); *B01D 2239/1216* (2013.01); *B01D 2239/1225* (2013.01); *B01D 2239/1233* (2013.01); *B01D 2239/1258* (2013.01); *B01D 2239/1266* (2013.01); *B01D 2239/1291* (2013.01); *B01D 2275/10* (2013.01); *B32B 2262/0253* (2013.01); *B32B 2262/0261* (2013.01); *B32B 2262/0276* (2013.01); *B32B 2262/12* (2013.01)

(58) Field of Classification Search
CPC .... B01D 2239/1266; B01D 2239/1258; B01D 2239/1225; B01D 2239/1216; B01D 2239/0216; B01D 2239/1291; B01D 2275/10; B23B 5/08; B23B 5/26; B32B 5/26; B32B 5/08; B32B 5/022; B32B 2262/12; B32B 2262/0276; B32B 2262/0261; B32B 2262/0253
USPC .......... 55/486, 520, 522, 527, 306, DIG. 39; 95/273, 287; 162/141; 210/505; 428/220; 442/346, 347, 350, 363, 389; 448/218, 219
See application file for complete search history.

(56) References Cited

U.S. PATENT DOCUMENTS

| | | | |
|---|---|---|---|
| 3,616,160 A | 10/1971 | Wincklhofer et al. | |
| 3,639,195 A | 2/1972 | Sanders | |
| 4,210,540 A | 7/1980 | Perrotta | |
| 5,108,827 A | 4/1992 | Gessner | |
| 5,167,764 A | 12/1992 | Nielsen et al. | |
| 5,167,765 A | 12/1992 | Nielsen et al. | |
| 5,580,459 A | 12/1996 | Powers et al. | |
| 5,620,641 A | 4/1997 | Berger | |
| 5,721,180 A | 2/1998 | Pike et al. | |
| 5,800,586 A | 9/1998 | Cusick et al. | |
| 5,853,439 A | 12/1998 | Gieseke et al. | |
| 5,948,344 A | 9/1999 | Cusick et al. | |
| 5,993,501 A | 11/1999 | Cusick et al. | |
| 6,143,049 A | 11/2000 | Gieseke et al. | |
| 6,146,436 A | 11/2000 | Hollingsworth et al. | |
| 6,171,355 B1 | 1/2001 | Gieseke et al. | |
| 6,174,603 B1 | 1/2001 | Berger | |
| 6,183,536 B1 | 2/2001 | Schultink et al. | |
| 6,187,073 B1 | 2/2001 | Gieseke et al. | |
| 6,251,224 B1 | 6/2001 | Dong | |
| 6,267,252 B1 | 7/2001 | Amsler | |
| 6,290,739 B1 | 9/2001 | Gieseke et al. | |
| 6,355,076 B2 | 3/2002 | Gieseke et al. | |
| 6,355,079 B1 | 3/2002 | Sorvari et al. | |
| 6,372,004 B1 | 4/2002 | Schultink et al. | |
| 6,419,721 B1 | 7/2002 | Hunter | |
| 6,419,839 B1 | 7/2002 | Cox et al. | |
| 6,528,439 B1 | 3/2003 | Stokes et al. | |
| 6,530,969 B2 | 3/2003 | Gieseke et al. | |
| 6,540,801 B2 | 4/2003 | Gieseke et al. | |
| 6,565,035 B1 | 5/2003 | Kim et al. | |
| H2086 H | 10/2003 | Amsler | |
| 6,649,547 B1 | 11/2003 | Arnold et al. | |
| 6,743,273 B2 | 6/2004 | Chung et al. | |
| 6,924,028 B2 | 8/2005 | Chung et al. | |
| 6,955,775 B2 | 10/2005 | Chung et al. | |
| 7,070,640 B2 | 7/2006 | Chung et al. | |
| 7,090,715 B2 | 8/2006 | Chung et al. | |
| 7,094,270 B2 | 8/2006 | Schultink et al. | |
| 7,192,462 B2 | 3/2007 | Stelzer et al. | |
| 7,314,497 B2 | 1/2008 | Kahlbaugh et al. | |
| 7,871,455 B1 | 1/2011 | Sands et al. | |
| 10,105,624 B2 * | 10/2018 | Izzi .................... | B01D 46/0082 |
| 2003/0089233 A1 | 5/2003 | Borla et al. | |
| 2003/0106294 A1 | 6/2003 | Chung et al. | |
| 2004/0077247 A1 * | 4/2004 | Schmidt .................... | B32B 5/26 442/382 |
| 2005/0020170 A1 | 1/2005 | Deka et al. | |
| 2008/0070022 A1 | 3/2008 | Umezu et al. | |
| 2009/0007528 A1 * | 1/2009 | Wilson ................. | B01D 46/002 55/306 |
| 2009/0044702 A1 | 2/2009 | Adamek et al. | |
| 2010/0054919 A1 | 3/2010 | Hiner et al. | |
| 2010/0159770 A1 | 6/2010 | Walser et al. | |
| 2010/0197171 A1 | 8/2010 | Matsumoto et al. | |
| 2010/0218471 A1 | 9/2010 | Smithies et al. | |
| 2011/0000845 A1 | 1/2011 | Fox et al. | |
| 2011/0036781 A1 | 2/2011 | Clements et al. | |
| 2011/0070420 A1 | 3/2011 | Lim et al. | |
| 2011/0198280 A1 | 8/2011 | Jones et al. | |
| 2012/0180444 A1 | 7/2012 | Nikolin et al. | |
| 2013/0327218 A1 | 12/2013 | Izzi et al. | |
| 2014/0083066 A1 | 3/2014 | Bahukudumbi et al. | |
| 2014/0260127 A1 * | 9/2014 | Boyce .................... | B64D 33/02 55/306 |
| 2014/0346107 A1 | 11/2014 | Anantharamaiah et al. | |
| 2014/0366732 A1 | 12/2014 | Gao | |

FOREIGN PATENT DOCUMENTS

| | | |
|---|---|---|
| WO | 0218693 | 3/2002 |
| WO | 2008103736 | 8/2008 |
| WO | 2012106659 | 8/2012 |

OTHER PUBLICATIONS

File History for U.S. Appl. No. 13/979,796 downloaded Nov. 9, 2018 (911 pages).

"First Office Action," for Chinese Patent Application No. 2012800076387, dated Jul. 29, 2014 (30 pages) with English translation.

"International Preliminary Report on Patentability," from PCT Application No. PCT/US2012/023860, dated Aug. 15, 2013, 5 pages.

"PCT International Search Report and Written Opinion from International," Application No. PCT/US2012/023860, U.S. Appl. No., dated Apr. 11, 2012, pp. 1☐8, 8.

"Second Office Action," for Chinese Patent Application No. 2012800076387, dated Jun. 10, 2015 (8 pages) with English translation.

"Third Office Action," for Chinese Patent Application No. 2012800076387, dated Jan. 22, 2016 (6 pages) with partial English translation.

\* cited by examiner

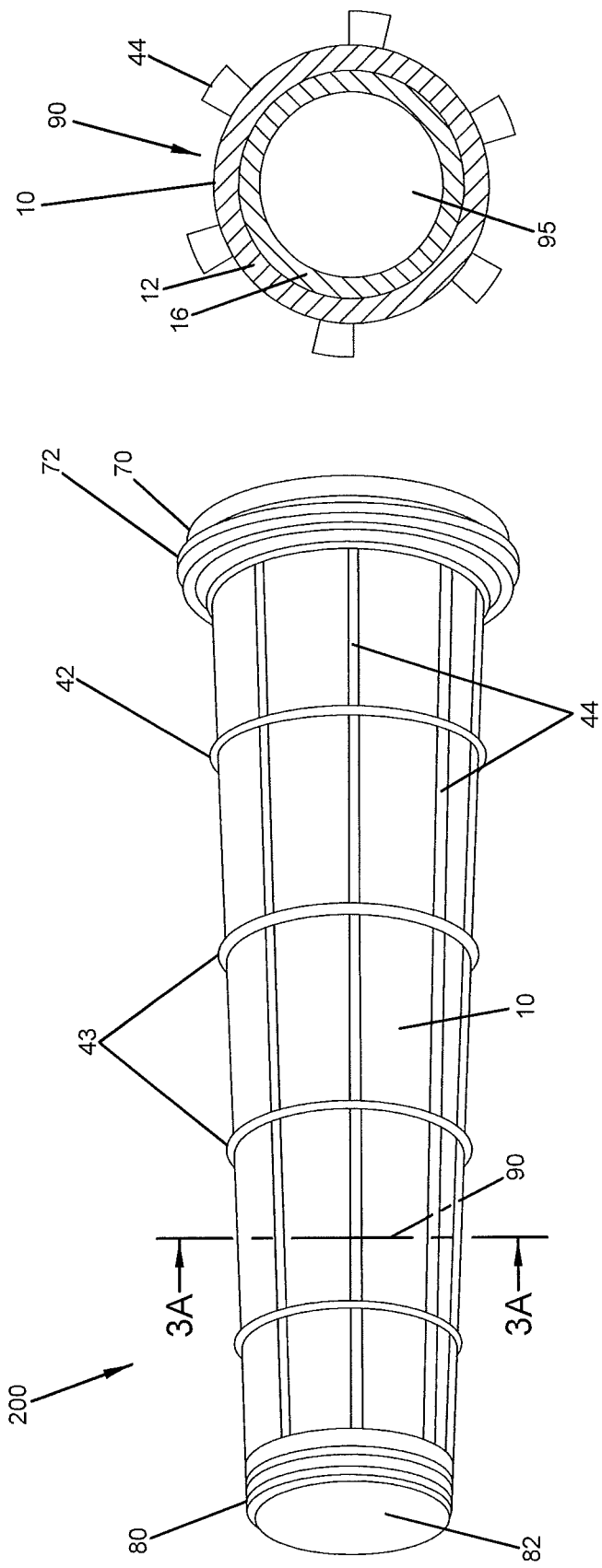

FILTER MEDIA PACK, FILTER ASSEMBLY, AND METHOD

CROSS REFERENCE TO RELATED APPLICATIONS

This application is a Continuation of U.S. application Ser. No. 13/979,796, filed Aug. 28, 2013, now U.S. patent Ser. No. 10/105,624, issued on Oct. 23, 2018, which claims priority to PCT International Patent Application No. PCT/US2012/023860, filed on Feb. 3, 2012, claims priority to U.S. Patent Application Ser. No. 61/439,218, filed Feb. 3, 2011, the contents of which are incorporated by reference herein in their entirety.

FIELD OF THE INVENTION

The field of the invention is air filter assemblies and methods of filtering air at high velocity. The air filter assemblies can be used in filtration products and processes requiring high throughput, for example inlet barrier filtration for aviation applications.

BACKGROUND

Non-woven webs for many end uses, including filtration media, have been manufactured for many years. Such structures can be made from bicomponent or core shell materials. Filtration media made from bicomponent materials are disclosed in, for example, Wincklhofer et al., U.S. Pat. No. 3,616,160; Sanders, U.S. Pat. No. 3,639,195; Perrotta, U.S. Pat. No. 4,210,540; Gessner, U.S. Pat. No. 5,108,827; Nielsen et al., U.S. Pat. No. 5,167,764; Nielsen et al., U.S. Pat. No. 5,167,765; Powers et al., U.S. Pat. No. 5,580,459; Berger, U.S. Pat. No. 5,620,641; Hollingsworth et al., U.S. Pat. No. 6,146,436; Berger, U.S. Pat. No. 6,174,603; Dong, U.S. Pat. No. 6,251,224; Amsler, U.S. Pat. No. 6,267,252; Sorvari et al., U.S. Pat. No. 6,355,079; Hunter, U.S. Pat. No. 6,419,721; Cox et al., U.S. Pat. No. 6,419,839; Stokes et al., U.S. Pat. No. 6,528,439; Amsler, U.S. Patent No. H2,086, U.S. Pat. Nos. 5,853,439; 6,171,355; 6,355,076; 6,143,049; 6,187,073; 6,290,739; and 6,540,801; 6,530,969; Chung et al., U.S. Pat. No. 6,743,273; Chung et al., U.S. Pat. No. 6,924,028; Chung et al., U.S. Pat. No. 6,955,775; Chung et al., U.S. Pat. No. 7,070,640; Chung et al., U.S. Pat. No. 7,090,715; and Chung et al., U.S. Patent Publication No. 2003/0 106294. This application incorporates U.S. Pat. No. 7,314,497, issued Jan. 1, 2008, and U.S. Publication No. 2009/0044702 published Feb. 19, 2009 by reference in their entirety. Such structures have been applied and made by both air laid and wet laid processing and have been used in fluid, both gaseous and air and aqueous and non-aqueous liquid filtration application, with some degrees of success.

Substantial prior art surrounding the use of bicomponent media in filter assemblies is directed to heating, ventilating, or air conditioning (HVAC) applications. For example, Arnold et al., U.S. Pat. No. 6,649,547, disclose a nonwoven laminate suitable for use as a filter for HVAC applications. The laminate has a microfiber layer integrated with a high loft multicomponent spunbond layer on one side and a low-loft multicomponent spunbond fiber on the other side. Preferably, the layers are through-air bonded and electret treated. Pike et al., U.S. Pat. No. 5,721,180 disclose a laminate filter media for HVAC applications, where first layer is electret high loft, spunbond crimped fiber web of low density and a second layer is electret meltblown microfiber layer having at least one polyolefin. Cusick et al., U.S. Pat. Nos. 5,800,586; 5,948,344; and 5,993,501, disclose a pleated composite filter media having randomly oriented fibers for use in HVAC type applications, e.g. automobile cabin air filtration. One or more thin stiffening layers help the construction retain its pleated formation, but the stiffening layer may also aid in filtration of dirt from air. Schultink et al., U.S. Pat. Nos. 7,094,270; 6,372,004; and 6,183,536, disclose a multiple layer filter for HVAC type applications or vacuum cleaner bags. Layers of filter media are bonded together in a laminate.

Air filtration applications such as HVAC applications involve a relatively low velocity of air through the filter media pack, for example less than 5 feet per minute (fpm). Other gaseous filtration applications include diesel engine crankcase ventilation (CCV) applications. CCV filters made from stacked, multiple layers of air laid and wet laid filtration media formed from bicomponent materials are described, for example, in U.S. Publication No. 2009/0044702 published Feb. 19, 2009, which is incorporated herein by reference in its entirety. Engine filtration applications for vehicles such as industrial diesel truck engines typically involve ventilation gas intake velocities of up to about 100 fpm. However, there are no filtration media formed from bicomponent materials that address high velocity air filtration applications, wherein intake air velocity exceeds 100 fpm or, in some applications, exceeds 500 fpm or even 600 fpm. Some air filtration applications, such as aviation inlet barrier filtration applications, involve air velocity of between about 500 fpm and 3000 fpm of air through the intake side of a filter element. Inlet barrier filters (IBF) are employed in high performance engines such as those used in civilian and military helicopters, or other turboprop type vehicle engines; other aviation engines such as jet engines; other high speed gas turbine engines; high power diesel or gasoline engines; and the like. IBF are employed to remove airborne particulates from the air intake path of the engine. Such particulates are of particular concern in helicopter engines, where large amounts of dust and debris are stirred up by the helicopter blades while the engine is engaged but the vehicle is grounded.

Conventional inlet barrier filters for high velocity applications are made from layers of oiled cotton gauze. The filters are typically reusable. When the filter becomes clogged and dirty, it is washed with plain water or water plus a detergent or another chemical additive supplied by the manufacturer, followed by drying and then reapplication of oil to the gauze layer before reuse. The cleaning cycle, from wash to reapplication of oil, can take as long as 24 hours including drying of the filter which must be done before oil can be reapplied. Labor time in washing and reapplication of oil is typically about 2-3 hours. The environmental, time, and cost impact of using oil-wetted media is burdensome.

To be useful in high velocity filter applications, filter media must be robust and yet allow for fast throughput of air, yet efficiently separate airborne particulates and debris from the air stream in order to protect the engine. Conventional wisdom dictates that higher velocity throughput requires thicker media in order to accomplish the required robustness in conjunction with satisfactory removal of particulates from gaseous streams moving at high velocity. However, thinner media allows higher velocity streams to pass through the filter without undue pressure drop. Thinner media are more easily washed and more quickly dried. Thus, there is a need for a robust, yet thin, high velocity air filter media that is effective in removing dust, dirt, and debris from the air intake path of engines where air intake rate is 100 fpm or above. There is a need for a high velocity air filter assembly that is easily and quickly washed with plain water. There is a need for a high velocity air filter that can be quickly removed, washed, and replaced on an engine without long periods of air drying and without use of oil.

SUMMARY

Disclosed herein are air filter assemblies formed from filter media having bicomponent materials. The media are easily formed into various filter assemblies such as panels, cartridges, inserts, etc. The filter assemblies are easy to manufacture. The filter assemblies are suitable for depth loading applications at air intake velocities of 100 fpm and higher, for example about 500 fpm to 3300 fpm. The filter assemblies and methods of filtration of gaseous streams are employed in applications wherein it is desirable to remove solid contaminants from air, such as debris and solid particulates wherein the particles have a broad range of particle sizes. Solid particulates include, for example, soot, sand, dust, grit, and powders of varying composition, origin, and particle size.

The filter assemblies of the invention include a media pack, which is a stack of more than one layer of filter media and typically is a composite stack having filter media of various compositions, permeability, loft, and the like. The media packs of the invention include a simple two layer composite construction, wherein a single layer of each of two filter media are stacked to form the media pack. Other media packs include more than two filter media layers. The first one or more filter media layers are high loft media, typically made by an air laid process from thermoplastic fibers and optional additional fibers and/or other non-fibrous additives. The high loft media is situated on the intake side of the filter assembly. In some embodiments, a single layer of high loft media is situated on the intake side of the filter element; in other embodiments more than one layer of high loft media is situated on the intake side of the filter element. The second one or more filter media layers are low loft media typically made by a wet laid process made from bicomponent fibers, glass fibers, and/or secondary fibers. The low loft media is situated on the exit side of the filter element. In some embodiments, a single layer of low loft media is situated on the exit side of the filter element; in other embodiments more than one layer of low loft media is situated on the exit side of the filter element. In one representative construction, a single layer of low loft media is simply contacted with a single layer of high loft media on a major side of each thereof, to form a media pack; the media pack is further disposed between two perforate support layers, such as stainless steel screens or some other scrim or screen material, to form a supported media pack. Optionally, the supported media pack is pleated to increase effective surface area of the filter element. The supported media pack is housed in a cartridge housing to form a filter assembly of the invention.

The filter assemblies of the invention are useful in high velocity air filtration applications without coating the filter media pack with oil or any other additional additives. The filter assemblies are easily cleaned with plain water and can be reused, in some embodiments, within 10 minutes after washing. The contacted media assemblies of the invention are thin, and therefore are easily cleaned. The filter assemblies are robust enough to withstand 2 cycles or more of washing and reusing in demanding high velocity air filtration applications such as helicopter inlet barrier filtration applications.

Additional advantages and novel features of the invention will be set forth in part in the description that follows, and in part will become apparent to those skilled in the art upon examination of the following, or may be learned through routine experimentation upon practice of the invention.

BRIEF DESCRIPTION OF THE DRAWINGS

FIG. 3 is a side view of a filter assembly of the invention.
FIG. 3A is a schematic cross-sectional view of the filter assembly of FIG. 3.

DETAILED DESCRIPTION

Figure 1:
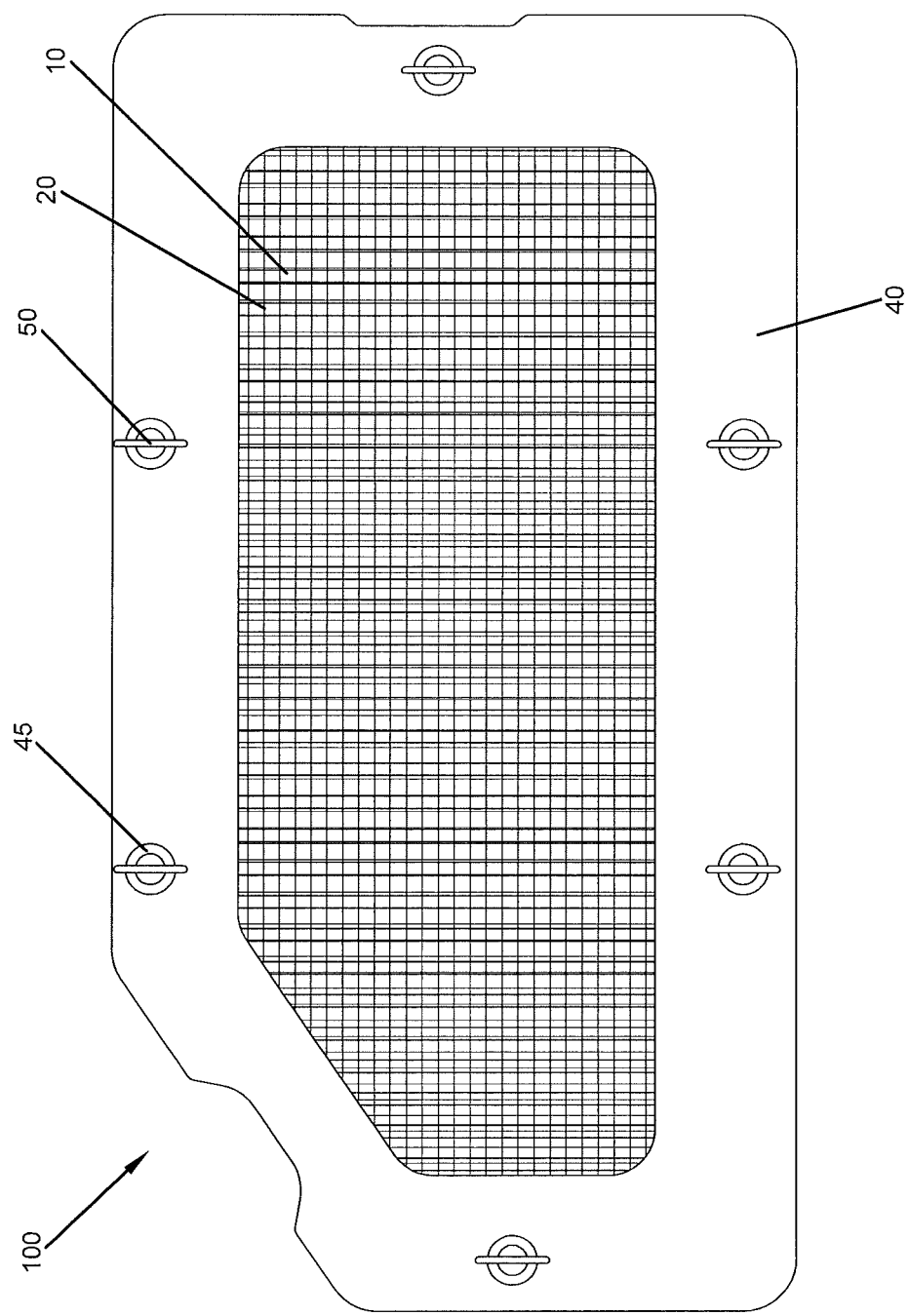
FIG. 1 is a top view of a filter assembly of the invention.

Various embodiments will now be described in detail. Reference to various embodiments does not limit the scope of the claims attached hereto. Additionally, any examples set forth in this specification are not intended to be limiting and merely set forth some of the many possible embodiments for the appended claims.

1. Definitions

As used herein, "high velocity air filtration" means filtration of air having air velocity of at least 500 fpm through the intake side of a filter element.

As used herein, "fiber" or "fibrous" means a large number of compositionally related fibers such that all the fibers fall within a range of fiber sizes or fiber characteristics that are distributed (typically in a substantially normal or Gaussian distribution) about a mean or median fiber size or characteristic.

As used herein, "bicomponent fiber" means a fiber formed from a thermoplastic material having at least one fiber portion with a melting point and a second thermoplastic portion with a lower melting point. The physical configuration of these fiber portions is typically in a side-by-side or sheath-core structure. In side-by-side structure, the two resins are typically extruded in a connected form in a side-by-side structure. Other useful morphologies include lobed bicomponent fibers, wherein the tips of the fibers have lobes that are formed from a lower melting point polymer than the rest of the fiber.

As used herein, "secondary fiber" means any fiber that is not a bicomponent fiber. In some embodiments, secondary fibers are used to obtain a filter medium in conjunction with bicomponent fibers in the filter media layers employed in the contacted media assemblies and filter assemblies of the invention.

As used herein, "fiber characteristics" means any aspect of a fiber including composition, density, surface treatment, the arrangement of the materials in the fiber, fiber morphology including diameter, length, aspect ratio, degree of crimp, cross-sectional shape, bulk density, size distribution or size dispersion, etc.

As used herein, "fiber size" is a subset of morphology and includes "aspect ratio," the ratio of fiber length to fiber diameter, wherein "fiber diameter" refers either to the diameter of a circular cross-section of a fiber, or to a largest cross-sectional dimension of a non-circular cross-section of a fiber.

As used herein, "fiber composition" means the chemical nature of the fiber and the fiber material or materials, including the arrangement of fiber materials. Fiber composition is, in various embodiments, organic or inorganic, synthetic or natural, thermoplastic or thermoset, and the like.

As used herein, the term "filter media pack" or "media pack" means a composite layered stack of one or more filter media. In embodiments, the media packs of the invention have a composite thickness of between about 0.2 mm to 2 cm when measured between about 0.002 psi and 0.125 psi.

As used herein, "filter media" or "filter medium" mean a nonwoven fibrous layer or web having a permeability and porosity suitable for use in a high velocity filtration application and within a high velocity air filter assembly and is not a substantially impermeable layer or web such as conventional paper, coated stock or newsprint made in a conventional papermaking processes. The term further relates to a web or layer that is generally sheet-like or, in embodiments, a planar structure having a thickness of about 0.05 mm to an indeterminate or arbitrarily larger thickness. This thickness dimension can be 0.1 mm to 2 cm, 0.2 mm to 1 cm or 0.5 mm to 5 mm. The thickness of any given filter medium will further depend on the pressure impinged on the media during the thickness measurement; where not otherwise noted, thickness of high loft layers are measured at 0.002 psi and thickness of low loft layers are measured at 0.125 psi. The filter medium is machinable, pleatable and otherwise capable of handling, washing, forming into a filter assembly or filter structure. The medium can have one or more gradient regions wherein a gradient of materials or physical characteristics is found through the thickness, width, or length of the filter medium layer or web.

As used herein, the term "web" or "layer" relates to a sheet-like or planar nonwoven structure of randomly dispersed fibers, wherein the web or layer has a width ranging from about 2.00 cm to an indeterminate or arbitrary width. The length of the web or layer is indeterminate or arbitrary.

As used herein, the term "gradient" indicates that some property of a filter medium that varies typically in the x or z direction in at least a region of the medium. In embodiments, the gradient is a physical property gradient. In other embodiments, the gradient is a chemical property gradient. In some embodiments, a filter medium has a gradient in at least one of permeability, pore size, fiber diameter, fiber length, fiber composition, efficiency, solidity, wettability, chemical resistance and temperature resistance. Either the composition or the concentration gradient of a fiber in the web or medium can change in a linear or non-linear fashion in any direction in the medium such as upstream, downstream etc. Methods of incorporating gradients in the filter media are disclosed, for example, in U.S. Patent Publication No. 2010/0187171, the contents of which are incorporated herein in their entirety.

As used herein, the term "pore size" refers to the average size of spaces between fibers and as defined by the arrangement of fibers and any other additives present within the filter media pack, in the substantial absence of contaminants therein. The pore size of the filter media can be and estimated by reviewing electron micrographs of the media. The average pore size of a media can also be calculated using a Capillary Flow Porometer having model no. APP 1200 AEXSC available from Porous Materials Inc. of Ithaca, N.Y. Pore size referred to in this disclosure also means mean flow pore diameter determined using a capillary flow porometer instrument like Model APP 1200 AEXSC sold by Porous Materials, Inc. of Ithaca, N.Y. (www.pmiapp.com).

As used herein, "pressure drop" means the resistance of a filter medium or a filter assembly to air flowing through it. Pressure drop is measured as the change in pressure between the intake surface of a filter medium or filter assembly and the exit surface of the air flow at a selected air flow rate. Typically, the pressure drop is expressed as the difference in inches of $H_2O$.

As used herein, "permeability" means the quantity of air in feet per minute (fpm) or meters per min (m/min) that will flow through a filter medium at a pressure drop of 0.5 inches of water. In general, permeability, as the term is used is assessed by the Frazier Permeability Test according to ASTM D737 using a Frazier Permeability Tester available from Frazier Precision Instrument Co. Inc. of Gaithersburg, Md. or a TexTest 3300 or TexTest 3310 available from available from Advanced Testing Instruments Corp (ATI) of Spartanburg, S.C. (www.aticorporation.com).

As used herein, "compressibility" means degree of resistance of filter media to compression or deformation in the direction of air flow through the media. Compressibility must be sufficiently low to maintain a material's thickness, and thereby maintain its pore structure and size and permeability and particulate removal performance during use. Compressibility is a comparison of two thickness measurements of a filter medium made using a dial comparator, wherein the medium is compressed using weights corresponding to 0.125 psi and 0.563 psi (8.6 millibars-38.8 millibars). Compressibility is expressed as a percent reduction in thickness between the two weights.

As used herein, "basis weight" means weight per unit of major surface area (i.e. not thickness, or z-dimension) of a filter medium. In embodiments, basis weight is described in $lb/ft^2$, $g/m^2$, or some other unit of measurement.

As used herein, "solidity" means volume of solid fiber in a filter medium divided by the total volume of the filter medium, expressed as a percentage. Solidity is variable depending on the pressure exerted during volume measurements.

As used herein, "high loft" means a filter medium having a solidity of about 0.1% to 3% at 0.002 psi.

As used herein, "low loft" means a filter medium having a solidity of about 4% to 25% at 0.125 psi.

As used herein, "efficiency" means the difference between the mass of particulate matter delivered in an air stream passing through a filter assembly, and the amount retained within the filter assembly, expressed as a percent.

As used herein, "depth media" or "depth loading media" refers to filter media in which a filtered solid particulate is acquired and maintained throughout the thickness or z-dimension of a filter medium or composite layered media. While in some embodiments particulate may in fact accumulate on the surface of depth media, a quality of depth media is the ability to accumulate and retain the particulate within the thickness of the media.

As used herein "media pack" or "filter media pack" refers to a stack of two or more layers of filter media, contacted in a manner suitable for disposition within a filter assembly.

As used herein, "filter element" or "filter assembly" means an assembly containing a filter media pack and a cartridge housing configured and arranged with the filter media pack disposed substantially therein. The filter assembly additionally has a first major side that is intended to contact an incoming stream of air as it flows through the filter element, which is defined herein as the "intake side" of the filter element. The filter assembly additionally has a second major side where air exits, having been passed through the filter media pack, which is defined herein as the "exit side" of the filter element.

As used herein, "perforate support" means a support screen, scrim, or other highly porous or perforated substrate that is mechanically and configurationally stable to the expected operating conditions during use, and is capable of being repeatedly washed with water or water plus a water soluble compound or mixture of compounds without substantial change in mechanical strength and without undergoing a substantial change in configuration. The perforate support does not itself cause substantial pressure drop at the expected air flow rates encountered in the intended use.

As used herein, the term "substantially" means the same or uniform, having minor fluctuations from a defined property, definition, etc. For example, small measurable or unmeasurable fluctuations in the permeability of a filter medium described herein may result from a slight compression of an outer engaged surface, by a cartridge housing in which the filter media is positioned. The filter medium, nonetheless, would be said to be substantially uniform in permeability. Other such fluctuations, for example in uniformity of particulate loading within a filter element, may result from the small but inherent enrichment or depletion of fiber in a filter medium caused by variations in the manufacturing process. In general, a depth media arrangement can be designed to provide loading of particulate materials substantially through its volume or depth.

2. Description of Representative Filter Media Packs and Filter Assemblies

The filter assemblies of the invention include filter media packs, the filter media packs including one layer each of non-woven high-loft and wet laid filter media. The filter media packs of the invention have formability, stiffness, tensile strength, low compressibility, and mechanical stability suitable for high velocity air filtration properties, as well as high particulate loading capability, low pressure drop during use, and a pore size and efficiency suitable for use in filtering airborne debris such as dust, grit, sand, and other particulate and non-particulate solid matter in high velocity air filtration applications. In some embodiments, the filter media in the filter packs of the invention employ bicomponent fibers. In some embodiments, the filter media further include binders such as latex deliverable resins. The filter assemblies and filter media packs of the invention do not employ added oils, yet provide excellent depth loading filtration properties in high velocity air filtration applications. The filter media packs of the invention include combinations of one low loft filter medium layer and one high loft filter medium layer, wherein at least the low loft filter medium layer is made up of randomly oriented arrays of bicomponent fibers. In some embodiments the filter media further include glass fibers. In some embodiments the filter media further include secondary fibers or other materials such as binder resins. In some embodiments, these fibers are bound together employing melt fused bicomponent fiber. In other embodiments a binder resin is employed to bind the fibers together.

In the media packs of the invention, one filter medium layer is formed to perform as the intake side in the filter assemblies of the invention. The intake side filter media is a high loft nonwoven filter media. Such high loft filter media are formed, in some embodiments, by air laid (or dry laid) methods. High loft filter media useful in the invention are formed, in some embodiments, from monocomponent thermoplastic fibers. In some embodiments, the monocomponent thermoplastic fiber is a polyester fiber, a polyolefin fiber, or a nylon fiber. The materials and fiber types employed to make the high loft filter media are not limited within the scope of the invention. Suitable high loft filter media useful in the filter assemblies of the invention are between about 0.2 to 20 mm thick, in some embodiments about 0.5 to 15 mm thick, and in some embodiments about 1 to 10 mm thick. In some embodiments, the high loft filter media have a basis weight of about 5 to 500 $g/m^2$, in some embodiments about 10 to 200 $g/m^2$, in some embodiments about 20 to 100 $g/m^2$, in some embodiments about 30 to 80 $g/m^2$. In some embodiments, the high loft filter media have compressibility of 10% up to about 90%, in some embodiments about 20% to 80%, in some embodiments about 10% to 25%. In some embodiments the high loft filter media have a permeability of about 50 m/min to 1000 m/min, in some embodiments about 100 m/min to 500 m/min, or in some embodiments about 150 m/min to 300 m/min. In some embodiments, the high loft filter media have solidity of about 0.1% to 3% at 0.002 psi, in some embodiments about 0.3% to 2% at 0.002 psi, and in some embodiments about 0.5 to 1.5% at 0.002 psi. One example of a suitable high loft media for use in the current invention is EM7558 sold by the Fiberbond Corp. of Michigan City, Ind. The media has a basis weight of about 62 $g/m^2$, thickness of about 5 mm, permeability of about 183 m/min, and a solidity of about 0.7% to 1.2% at 0.002 psi.

In the filter media packs of the invention, one filter medium layer is formed to perform as the exit side in the filter assemblies of the invention. The exit side filter media is a low loft filter media layer. In some embodiments, the low loft filter media is a wet laid filter medium, that is, a filter medium made using a wet laid process. In some such embodiments the wet laid process is a papermaking processes. Papermaking type processes are particularly useful to form wet laid filter media and many of the fiber components employed to make wet laid filter media are designed for wet laid processing. In embodiments, fibers and optionally additional materials are mixed with a liquid to form a substantially uniform fiber slurry. The fiber slurry is then subjected to a wet laid papermaking process to form a nonwoven web or layer. In some embodiments of wet laid processing, the wet laid medium is formed from an aqueous slurry comprising a dispersion of fibrous material in an aqueous liquid. In some embodiments the aqueous liquid of the dispersion is water. In some embodiments the aqueous liquid further includes other materials. In some such embodiments, the other materials include one or more of pH adjusting materials, water miscible cosolvents, latex particles, dispersed solid particles such as activated carbon or zeolites and the like, surfactants, flame retardants, viscosity modifiers, media treatments, colorants, crosslinkers, antifoaming agents, bactericidal or fungicidal agents, antioxidants, and the like, and mixtures thereof. Once the slurry is formed into a wet laid web or layer by a papermaking process, the wet laid web or layer is dried, cured or otherwise processed to result a dry, permeable sheet, web, layer, or filter medium capable of performing as the exit side filter medium layer of the invention. In embodiments, processing of the wet laid layer includes adding heat to form, bond and dry the wet laid layer into a wet laid filter medium useful as the exit side filter medium of the invention, that is, the low loft filter medium.

In embodiments, the machines used in wet laid medium formation are hand laid sheet equipment, Fourdrinier papermaking machines, cylindrical papermaking machines, inclined papermaking machines, combination papermaking machines and other machines. In embodiments, any mechanism whereby a fiber slurry is applied as a wet film, layer or layers to a substrate, whereupon the aqueous liquid components are at least partially separated from the fiber components of the slurry to form a nonwoven mat or sheet of randomly dispersed fibers and optionally other materials, is useful in wet laid processing to form the wet laid filter media of the invention. Inclined and cylindrical papermaking machines include, in some embodiments, a continuous gradient forming mixing partition such as those disclosed in U.S. Patent Publication No. 2010/0187171, the contents of which are incorporated herein in their entirety.

Once sufficiently dried and processed to form an exit side filter medium in the filter assemblies of the invention, the wet laid, or low loft, filter media are between about 0.1 to 5 mm thick, in some embodiments about 0.2 to 3 mm thick, in some embodiments about 0.3 to 2 mm thick, and in some embodiments about 0.5 to 1 mm thick. In some embodiments, the low loft filter media have a basis weight of about 20 to 200 g/m$^2$, in some embodiments about 30 to 150 g/m$^2$, in some embodiments about 40 to 100 g/m$^2$, in some embodiments about 50 to 80 g/m$^2$. In some embodiments, the low loft filter media have compressibility of 0% up to about 50%, in some embodiments about 5% to 30%, in some embodiments about 10% to 25%. In some embodiments the low loft filter media have a permeability of about 1 m/min to 300 m/min, in some embodiments about 10 m/min to 200 m/min, in some embodiments about 25 m/min to 100 m/min, or in some embodiments about 50 m/min to 75 m/min. In some embodiments, the low loft filter media have solidity of about 4% to 25% at 0.125 psi, in some embodiments about 5% to 10% at 0.125 psi, and in some embodiments about 5.5% to 8% at 0.125 psi.

In embodiments, fibers useful in forming the low loft, exit side filter media employed in the media packs of the invention include bicomponent fibers, glass fibers, secondary fibers, and mixtures thereof. In some embodiments, bicomponent fibers and glass fibers are the sole fibers employed to form the low loft, exit side filter media. In other embodiments, the low loft filter media further employ secondary fibers. In still other embodiments, bicomponent fibers and secondary fibers are the sole fibers employed to form the low loft, exit side filter media.

Bicomponent fibers are useful in forming mechanically stable, but strong, permeable filtration media that can withstand the mechanical stress of the passage of debris laden air at high velocity and can maintain the loading of debris during use, as well as withstand repeated washing and drying cycles between loadings. The bicomponent fibers useful in forming either the high loft filter media or the low loft filter media useful in the filter assemblies of the invention are of a core/shell (or sheathed) morphology, side-by-side morphology, islands-in-the-sea morphology, or lobed morphology. The bicomponent fibers are made up of at least two thermoplastic materials having different melting points. In embodiments, thermoplastic polymers useful in forming either the core or the sheath of the bicomponent fibers useful in filter media of the present invention include polyolefins such as polyethylene, polypropylene, polybutylene, poly-α-octene, and copolymers thereof including linear low density, low density, high density, ultra-high density, and other morphological and compositional designations; polytetrahaloethylenes such as polytetrafluoroethylene and polychlorotrifluoroethylene; polyesters such as polyethylene terephthalate, polybutylene terephthalate, or polyethylene naphthalate; polyvinyl acetate, polyvinyl alcohol, and copolymers thereof; polyvinyl halides such as polyvinyl chloride, polyvinylidene halides such as polyvinylidene chloride, polyvinylidene fluoride, and the like and copolymers thereof; polyacetals such as polyvinyl butyral, acrylic resins (polyacrylates) such as polymethylacrylate esters and polymethylmethacrylate esters and copolymers thereof including copolymers of acrylic acid and salts thereof; polyamides such as nylon 6, nylon 66, nylon 6,10, nylon 46, and the like and copolymers thereof; polystyrene and copolymers thereof; polyurethanes; polyureas; cellulosic resins, namely cellulose nitrate, cellulose acetate, cellulose acetate butyrate, ethyl cellulose, and the like; copolymers of any of the above materials, such as ethylene-vinyl acetate copolymers, ethylene-acrylic acid copolymers, styrene-butadiene block copolymers, KRATON® rubbers, and the like. In embodiments, a polyolefin/polyester sheath/core bicomponent fiber is employed whereby the polyolefin sheath melts at a lower temperature than the polyester core. In other embodiments, two polyolefins, or two polyesters, two polyvinyl halide, two polyvinylidene halide, two polyamide polymers, or any other two polymers that are similar or identical chemically are employed as core and sheath, wherein compositional (e.g. the particular monomer composition mix used to synthesize the polymer, or the blockiness of the monomer concentration in a copolymer), molecular weight, or morphological differences such as degree of branching or degree of side chain crystallization and the like provide lower and higher melting or softening polymer materials.

In embodiments, the lower melting component of the bicomponent fibers is employed as the sheath in a core/sheath morphology (or shell in a core/shell morphology), as the lobes in a lobed morphology, as the "islands" in an islands-in-the-sea morphology, or as one side of a side-by-side morphology. The lower melting component provides a melt fusing capability to the formed filter media pack, wherein the nonwoven wet laid or air laid webs are heated to a temperature above the melting point or glass transition temperature of the lower melting component and below the melting point or glass transition temperature of the higher melting component. In embodiments, melt fusing is accomplished when the molten or softened fiber components contact other bicomponent fibers, as well as any other fibers and additives within the formed wet laid or air laid filter media pack. In such embodiments, when the temperature is subsequently reduced to at or below the intended end use temperature, the bicomponent fibers have become at least partially melt fused by virtue of the sheath (or lobe or side), while substantially retaining the nonwoven characteristics of loft, permeability, porosity, basis weight, thickness, and the like imparted by the air laid or wet laid process employed to form the media. These nonwoven characteristics are retained by virtue of the higher melting core or side of the bicomponent fiber that retains its fibrous morphology during melt fusing. Further, the melt fused bicomponent fiber imparts desirable properties, including reduced compression and increased tensile strength; the melt fused bicomponent fiber further improves utilization and retention of glass fiber and other secondary fibers and/or additive materials in the filter media or filter assemblies of the invention.

In embodiments, one core/sheath bicomponent fibers known as Advansa 271P available from E. I. Dupont Nemours, Wilmington Del. is useful in forming both the high loft and low loft filter media useful in the filter assemblies of the invention. Other useful bicomponent fibers include the T-200 series of concentric core/sheath fibers available from Fiber Innovation Technology, Inc. of Johnson City, Tenn.; Kuraray N720, available from Engineered Fibers Technology, LLC of Shelton, Conn.; Nichimen 4080, available from Nichimen America Inc. of New York, N.Y.; and similar materials. All of these fibers demonstrate the characteristics of melt fusing as described above.

In embodiments, the filter media useful in the filter media packs of the invention include glass fibers. In some embodiments glass fibers provide pore size control and cooperate with the other fibers in the medium to obtain a medium of sufficient loading capacity, efficiency, solidity, permeability, compressibility, basis weight, and tensile strength for high velocity air filtration applications. The term glass fiber "source" means a glass fiber composition characterized by a glass type, average fiber diameter and length, or aspect ratio, and available as a distinct raw material. Blends of two or more of such sources do not read on single sources. In embodiments, glass fibers useful in the low loft media of the present invention include glass types known by the designations: A, C, D, E, Zero Boron E, ECR, AR, R, S, S-2, N, and the like, and generally, any glass that can be made into fibers either by drawing processes used for making reinforcement fibers, or spinning processes used for making thermal insulation fibers. In embodiments, the glass fibers have a diameter about 0.1 to 10 micrometers and an aspect ratio (fiber length divided by fiber diameter) of about 10 to 10,000. Commercially available fibers are characteristically sized with a sizing coating. Such coatings cause the otherwise ionically neutral glass fibers to form and remain in bundles. Glass fiber in diameter less than about 1 micron is typically not sized. Large diameter chopped glass is sized. Manufacturers of glass fibers commonly employ sizing compositions including one or more cationic antistatic agents to eliminate fiber agglomeration and permit a uniform dispersion of the glass fibers upon agitation of the dispersion in a papermaking slurry such as those described above. In some embodiments, glass fibers such as Lauscha B50R, B010F, and B08F from Lauscha Fiber Intl. of Summerville, S.C. are suitable glass fibers for forming the filter media useful in the media packs of the invention.

In embodiments, the filter media useful in the filter media packs of the invention contain glass fibers in an amount corresponding to about 10% to 90% by weight of the total solids in the filter medium, or about 20 to 80% by weight of the total solids in the filter medium, or about 25% to 75% by weight of the total solids in the filter medium, or about 50% by weight of the total solids in the filter medium. In some embodiments, a blend of more than one source of glass fiber is employed, wherein the blend of more than one source of glass fiber is employed to form the total weight percent of glass fiber in the filter medium. In some such embodiments, the blend of glass fiber sources is selected to control the permeability of the filter media. For example, in some embodiments, combining glass fibers from more than one source of glass fiber having an average fiber diameter of about 0.3 to 0.5 micrometer, glass fiber having an average fiber diameter of about 1 to 2 micrometers, glass fiber having an average fiber diameter about 3 to 6 micrometers, glass fiber with a fiber diameter of about 6 to 10 micrometers, and glass fiber with fiber diameter of about 10 to 100 micrometers in varying proportions, including blends of two or more thereof, increases the permeability of the filter media pack. In some such embodiments, the glass fiber blends are selected to impart a controlled pore size, resulting in a defined permeability, to a filter medium.

In one embodiment of the invention, a low loft filter media useful in a media pack of the invention includes about 50% by weight of Advansa 271P bicomponent fiber (available from E. I. Dupont Nemours, Wilmington Del.) and about 50% by weight of Lauscha B50 glass microfiber (available from Lauscha Fiber Intl. of Summerville, S.C.). The media is formed by a wet laid or papermaking type process to result in a media having a basis weight of about 60 $g/m^2$ to 70 $g/m^2$, layer thickness of 0.5 mm to 0.65 mm at 0.125 psi, compressibility of 15% to 20% between 0.125 psi and 1.5 psi, permeability of 50 m/min to 60 m/min, and solidity of 6-7% at 0.125 psi.

In some embodiments, the filter media useful in the filter media packs of the invention contain secondary fibers. Secondary fibers are any fibers that are not bicomponent fibers or glass fibers. Secondary fibers are made from one or more hydrophilic, hydrophobic, oleophilic, and/or oleophobic polymers or other materials. In various embodiments, the secondary fibers are selected for fiber characteristics that aid in obtaining appropriate surface chemistry characteristics, pore size, permeability, efficiency, tensile strength, compressibility, and/or other desirable filter properties suitable for high velocity air filtration applications. These fibers cooperate with the bicomponent fibers and, in some embodiments, the glass fibers to form mechanically stable, but strong, permeable filtration media that can withstand the mechanical stress of the passage of debris laden air at high velocity and can maintain the loading of debris during use, as well as withstand repeated washing and drying cycles between loadings. In some embodiments, secondary fibers are monocomponent fibers. In some embodiments, the secondary fibers are formed from blends or alloys of two or more polymer compositions, molecular weights, or morphologies. In some embodiments, secondary fiber diameters range from about 0.1 to about 50 micrometers. In some embodiments the secondary fibers are crimped fibers. Secondary fibers are made from a variety of materials including naturally occurring cotton, linen, wool, various cellulosic and proteinaceous natural fibers, or any of the thermoplastic polymers useful in forming either the core or the sheath of bicomponent fibers that are listed above. One type of secondary fiber is a binder fiber that cooperates with other fiber components to bind the fiber components into the web. Another type of secondary fiber is a structural fiber that cooperates with other fiber components to increase the tensile and burst strength the materials in dry and wet conditions. Secondary fibers can also include inorganic fibers such as carbon/graphite fiber, metal fiber, ceramic fiber and combinations thereof.

Where secondary fibers are employed in the filter media, they are present in amounts corresponding to about 1% to 90% by weight of the total solids in the filter media; or at about 5% to 80% by weight of the total solids in the filter media, or at about 10% to 75% by weight of the total solids in the filter media, or at about 25% to 50% by weight of the total solids in the filter media. In some embodiments, the high loft, intake side filter media incorporates one or more secondary fibers. In other embodiments, the low loft, exit side filter media incorporates one or more secondary fibers. In still other embodiments, both the high loft and low loft filter media incorporate one or more secondary fibers. In some embodiments, the low loft filter media incorporates secondary fibers and no glass fibers; in other embodiments, the low loft filter media incorporates both secondary fibers and glass fibers.

In some embodiments, binder resins are employed to increase fiber-to-fiber fusing, for example where cellulosic or glass fibers are employed, and thereby increase the mechanical stability of the filter media pack. Binder resins are not generally necessary to obtain adequate strength in the filter media of this invention but are useful in certain embodiments of the filter media pack, for example in high velocity air filtration applications where the air velocity across the filter is in excess of 3000 fpm. In various embodiments, binder resin materials are delivered as dry powders, dispersed or dissolved in solvents, or as latex dispersions. Resin used as binder can be in the form of water soluble or dispersible polymer added directly to a wet laid slurry or in the form of secondary fibers ("binder fibers") intermingled with the other fibers in a wet laid or air laid web to be activated as a binder by heat applied after the nonwoven web is formed.

Useful binder resins include, in various embodiments, vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins. In embodiments, binder resins useful in wet laid filter media and deliverable as water soluble or dispersible binder polymers are water soluble or water dispersible thermosetting resins such as acrylic resins, methacrylic resins, polyamide resins, epoxy resins, phenolic resins, polyureas, polyurethanes, melamine formaldehyde resins, polyesters and alkyd resins, generally, and specifically, water soluble acrylic resins, methacrylic resins, polyamide resins, and the like that are in common use in the papermaking industry. In some embodiments, water soluble or dispersible binder polymers coat the fibers and act to adhere fiber to fiber in the final filter media useful in the low loft filter media. Sufficient resin is added to a slurry, for example, to fully coat the fibers without causing film-over of the pores formed in the web, layer, or filter medium. In some embodiments, the binder resin is added to the slurry during a wet laid medium formation. In other embodiments, the binder resin is applied to the filter medium after the wet laid or air laid medium formation.

Where binder resins are employed, they are present in the filter media at amounts corresponding to about 1% to 30% by weight of the total solids in the filter media; or at about 5% to 20% by weight of the total solids in the filter media, or at about 5% to 10% by weight of the total solids in the filter media. In some embodiments, the high loft, intake side filter media layer of the filter media pack incorporates one or more binder resins. In other embodiments, the low loft, exit side filter media layer of the filter media pack incorporates one or more second binder resins. In still other embodiments, both the high loft and low loft filter media of the filter media pack incorporate one or more binder resins.

In some embodiments, the filter media employed in the media packs of the invention include one or more additional materials. The additional materials include, in various embodiments, solid particles such as activated carbon or zeolites and the like, surfactants, resins, flame retardants, viscosity modifiers, media treatments, colorants such as dyes or pigments, chemically reactive compounds such as cross-linkers, bactericidal or fungicidal agents, antioxidants, and the like, or mixtures of one or more thereof. In some embodiments, the one or more additional materials are added into the fiber slurry during media formation. In other embodiments, the one or more additional materials are added to the filter media after formation, wherein in the case of a wet laid media "after formation" means after the wet laid media formation and either before or after drying. In embodiments, the one or more additional materials are applied by spraying, dipping, curtain coating, die coating, roll coating, rotogravure coating, or plasma coating of the filter media pack.

3. Description of Representative Filter Assemblies

In some embodiments, the filter assemblies of the invention are formed with a single layer of high loft filter media. In some embodiments, the filter assemblies of the invention are formed with a single layer of low loft filter media. In still other embodiments, the filter assemblies are formed with a single layer each of high loft filter media and low loft filter media. In some embodiments of the invention, the high loft and low loft filter media are simply contacted on a major surface of each of the media layers thereof to form a media pack of the invention, wherein no further treatment of the media or the media pack is required prior to assembling the filter assemblies of the invention. In embodiments, the media pack is placed two layers of a perforate support, forming a supported media pack, and a cartridge housing is then applied to surround the supported media pack to form a finished filter assembly.

In embodiments, the media pack is about 0.1 mm to 2 cm thick at 0.125 psi, in some embodiments about 0.5 mm to 1 cm thick at 0.125 psi, and in some embodiments about 1 mm to 10 mm thick at 0.125 psi. In some embodiments, perforate support layers disposed on both sides of the media pack compress the media pack and so the effective thickness of the media pack disposed within the supported media pack is less than the thickness of the media pack alone. In some embodiments, the media pack has a composite basis weight of about 25 $g/m^2$ to 500 $g/m^2$, in some embodiments about 50 $g/m^2$ to 300 $g/m^2$, and in some embodiments about 75 $g/m^2$ to 200 $g/m^2$. In some embodiments the media pack has a composite permeability of about 25 m/min to 500 m/min, in some embodiments about 50 m/min to 300 m/min, and in some embodiments about 100 m/min to 200 m/min.

In embodiments, the perforate support is formed from metal. For example, aluminum or stainless steel wire cloth is useful in various embodiments of the invention. In some embodiments, the wire cloth has a wire diameter of about 0.5 millimeter (mm) to 50 mm, or about 5 mm to 30 mm, or about 10 mm to 25 mm. In some embodiments, the wire cloth mesh is 16×16; mesh is selected based on the specific intended application, e.g. the specific expected range of air velocity in the intended filtration application. In some embodiments the wire cloth has 10 to 15 warp wires per inch and 8 to 12 fill wires per inch wherein the wire diameter prior is as described above. In some embodiments, the wire cloth is an epoxy coated wire cloth, such as a carbon steel wire cloth or an epoxy coated stainless steel wire cloth. In some such embodiments, epoxy coated wire cloth is coated with about 5 g to 50 g of epoxy per square meter of wire cloth, in some embodiments about 10 g to 40 g of epoxy per square meter of wire cloth, in some embodiments about 20 g to 30 g of epoxy per square meter of wire cloth. The amount and type of epoxy used to coat the wire cloth is selected for durability and ability to coat the wire without causing an undesirable amount of mesh size reduction. In still other embodiments, expanded metal is used as the perforate support. In still other embodiments, a thermoplastic or thermoset synthetic polymer is used to form a perforate support, for example a screen, scrim, perforated sheet, frame, or the like. In still other embodiments, a ceramic material is used to make a perforate support. In still other embodiments, a combination of one or more metals, thermoplastics, thermosets, or ceramics are used to make a perforate support. It will be understood that the variable parameters associated with the perforate support are selected by one of skill and based on the specific intended end use, and that the invention as described herein is not limited as to the specific type of perforate support usefully employed with the filter constructions of the invention. A wide variety of perforate supports are commercially available as standard or custom materials and dimensions. For example, stainless steel wire cloth is available from Gerard Daniel & Co., Inc. of New Rochelle, N.Y.

In some embodiments, the supported media pack is pleated or fluted prior to adding a cartridge housing to form a filter element. In such embodiments, the pleats or flutes are formed after a supported media pack is formed because the perforate support supplies the strength and rigidity necessary to hold the pleats in place with the media pack disposed therein. In other embodiments, the media pack is pleated or fluted before or after contacting the high loft media layers and the low loft media layers but without a perforate support. Where the media pack or supported media pack is pleated, the pleat height and frequency (number of pleats per unit of length) are not particularly limited. In some embodiments, the pleat height is about 50 mm to 10 cm, or about 1 cm to 7 cm, or about 2.5 cm to 5 cm. In embodiments, the pleat frequency is about 10 per cm to 0.1 per cm, or about 5 per cm to 0.5 per cm, or about 2 per cm to 0.8 per cm. In some embodiments a single pleat side defines a rectilinear shape such as a square or rectangle; in other embodiments a single pleat side defines a triangle. A triangular pleat side is generally associated with conical filter assemblies. Triangular pleats are generally referred to herein as fluted pleats, or flutes. Pleated and fluted media are understood by one of skill to increase the effective (filtration) surface area of a filter assembly.

The supported media pack, in some embodiments after pleating or fluting, is mounted in a cartridge housing to form a finished filter element. In some embodiments, the cartridge housing is a frame. In some embodiments, the frame is a simple planar frame to which the supported media pack is bonded by an adhesive or mechanical means and which serves the function of holding the supported media pack in place during use, and in some embodiments of further forming a seal around the engine intake air path such that all air intake must traverse the filter media pack. In some embodiments, the cartridge housing substantially encloses the media pack, wherein the enclosed cartridge housing has at least an inlet and outlet tube, valve, or the like to provide for air flow therethrough. In some embodiments a major portion of the cartridge housing is formed from a metal. In other embodiments the major portion of the cartridge housing is formed from a thermoplastic or thermoset polymeric formulation. In some embodiments, the cartridge housing is further be appended with various mechanical items such as inlet or outlet tubes or valves, holes for attaching the cartridge housing to a secondary structure via bolts or screws, supporting members, gasket members, and the like. The type, shape, and general configuration of the cartridge housing is not particularly limited and may be designed to meet the requirements of any intended end use. The cartridge housing is designed and configured such that the filter assembly substantially covers the air intake path or port of one or more engines, while exposing the supported media pack to the air intake flow path and further disposing the intake side filter media of the supported media pack in the upstream end of the air flow path and disposing the exit side filter media of the supported media pack in the downstream end of the air flow path.

One useful type of cartridge housing is an aluminum alloy frame assembly that includes a sealing member that is a foam rubber gasket, such as a silicone rubber foam gasket, and includes means to mechanically attach the filter assembly to the engine air intake, that is, holes through which the filter assembly is bonded through a mated set of holes in the engine air intake path by wing nuts, bolts, screws, or another type of fastener. One useful type of cartridge housing is one that is adapted to fit a turbine driven rotary aircraft air inlet port; that is, an inlet barrier filter assembly.

The filter assemblies of the invention as described herein are useful in high velocity air filtration applications without any further treatments aside from what has already been described. So, for example, oil is not required to be applied to the filter assemblies prior to use. Nor is any oil treatment required after multiple cleaning steps in order to provide depth loading of particulates and the debris encountered in high velocity air filtration application. However, in some applications it may be advantageous to add oil or some other material to the filter element, or the supported media pack, or to the media pack as a post treatment. The invention is not limited to exclude such post treatments. Other post treatments may be useful in certain high velocity air filtration applications. For example, in some embodiments the addition of a colored dye or pigment is useful in differentiating between filter assemblies for different engines; such color is added, in some such embodiments, by spray or dip coating one or more filter media layers, a media pack, a supported media pack, or a filter assembly prior to use in the intended high velocity air filtration application. In other embodiments, flame retardant compounds are added in a post treatment by spray or dip coating one or more filter media layers, a media pack, a supported media pack, or a filter assembly prior to use in the intended high velocity air filtration application. Other useful post treatments are easily envisioned and the invention is not particularly limited with respect thereto.

FIG. 1 illustrates a representative filter assembly of the invention. Illustrated is the top view, or intake side view, of filter assembly 100. Filter assembly 100 has media pack 10 visible through wire mesh cloth 20. Media pack 10 is disposed within wire mesh cloth 20 and media pack 10 and wire mesh cloth 20 and disposed within frame 40. The combination of media pack 10 and wire mesh cloth 20 forms the supported media pack [10/20]. In some embodiments, supported media pack [10/20] is pleated. In other embodiments, supported media pack [10/20] is substantially planar. Frame 40 is designed and configured to cover an air intake area of an engine. Frame 40 further defines openings 45, through which wing nuts 50 are disposed.

Figure 2:
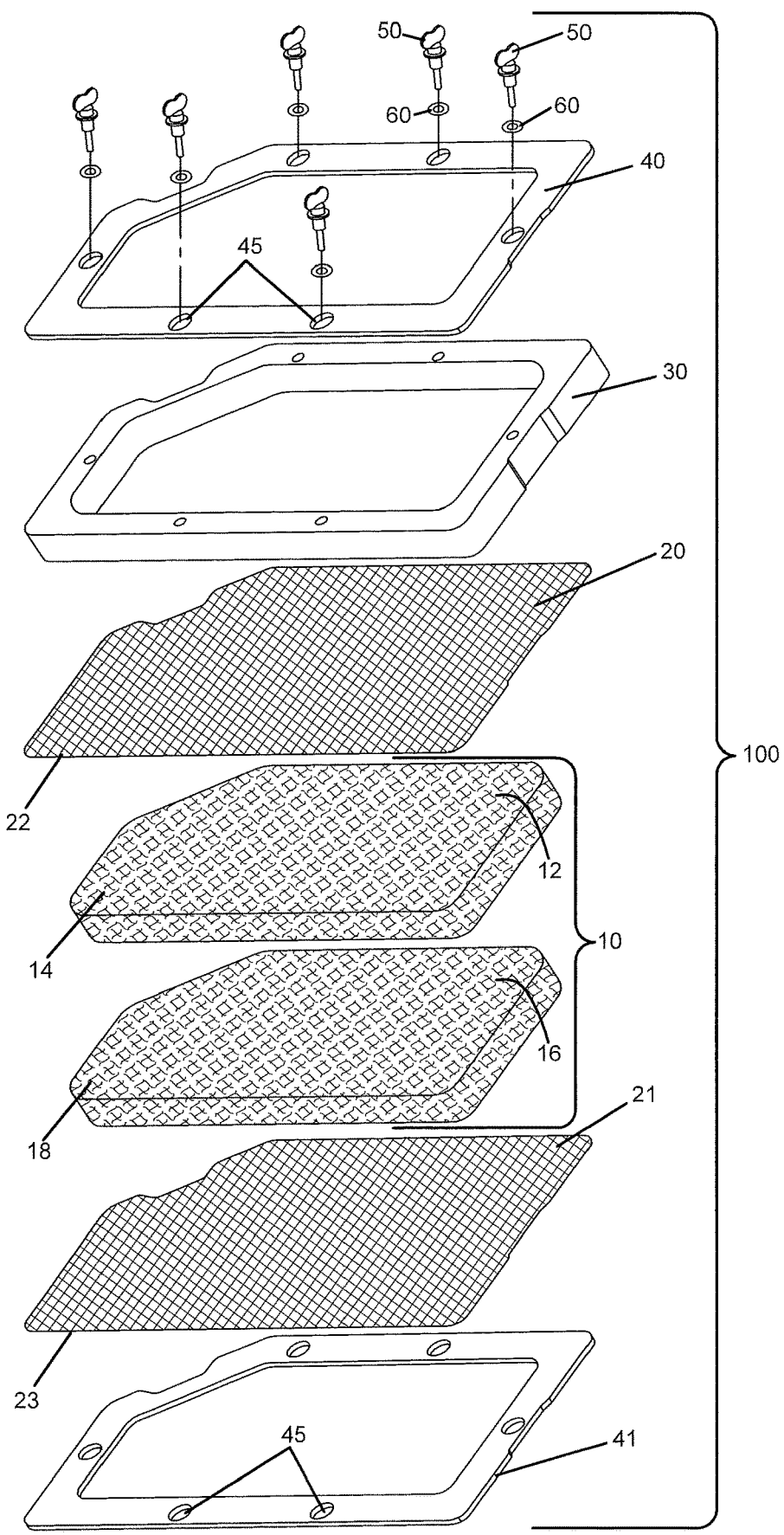
FIG. 2 is an exploded view of the filter assembly of FIG. 1.

FIG. 2 is an exploded view of the filter assembly illustrated in FIG. 1. Media pack 10 has media layers 12 and 16. Media layer 12 is a high loft filter media layer having an edge area 14. Media layer 12 is disposed on the intake side of filter assembly 100. Media layer 16 is a low loft filter media layer having an edge area 18. Low loft filter media layer 16 is disposed on the exit side of filter assembly 100. First wire mesh layer 20 is disposed on media pack 10 on a major surface of high loft filter media layer 12. Second wire mesh layer 21 is disposed on media pack 10 on a major surface of low loft filter media layer 16. Wire mesh layers 20, 21 have the same or different mesh configurations, wire type, wire diameter, surface coatings or lack thereof, and the like. First wire mesh layer 20 has edge area 22, and second wire mesh layer 21 has edge area 23. Wire mesh layers 20, 21 are assembled with media pack 10 disposed therebetween to form a supported media pack [20/10/21].

The supported media pack [20/10/21] is disposed between first frame member 40 and second frame member 41. First frame member 40 is designed and configured to secure the supported media pack [20/10/21] within the filter assembly 100 on the intake side of an engine air intake flow path during use, and second frame member 41 is designed and configured to secure supported media pack [20/10/21]

within the filter assembly 100 on the exit side of an engine air intake flow path during use and further secure filter assembly 100 to an air intake port of an engine. Frame members 40, 41 surround and are in contact with supported media pack [20/10/21] at the edge areas 14, 18, 22, 23. Frame members 40, 41 define a perimeter of the filter assembly 100. Frame members 40 and 41 are the same or different in terms of materials, surface coatings, thickness of the frame member, and the like. In some embodiments, one or both of frame members 40, 41 have additional features not shown in the illustration. Also disposed between frame members 40, 41 is flexible gasket 30. Gasket 30 is disposed between frame members but generally outside the edge areas 14, 18, 22, 23 of supported media pack [20/10/21] in the assembled filter assembly 100. Frame members 40, 41 further define openings 45 that are configured and arranged to receive wingnuts 50 having retainer rings 60 disposed thereunder. Openings 45 and wingnuts 50 with retainer rings 60 cooperate to form filter assembly 100 when the supported media pack [20/10/21] and gasket 30 are placed between frame members 40, 41 and wingnuts 50 are disposed through openings 45.

Many alternative embodiments of filter assembly 100 will be envisioned; some or all of the various alternative embodiments described below are useful alone or in combination, depending on the particular engine configuration for which the filter assembly is to be used. The overall size of filter assembly 100 will vary depending on the particular engine configuration for which the filter assembly is to be used. In some embodiments, the supported media pack [20/10/21] is pleated to form a pleated assembly. In some embodiments, an adhesive is disposed in the perimeter of filter assembly 100 between one or more edge areas 14, 18, 22, 23 of supported media pack [20/10/21] and one or both of first frame member 40 and second frame member 41, to firmly adhere supported media pack [20/10/21] to frame member 40, frame member 41, or both in the perimeter area defined by frame members 40, 41. In some embodiments, there are no wire mesh layers 20 or 21; in other embodiments there is a single wire mesh layer that is either wire mesh layer 20 or 21. In some embodiments, one or more wire mesh layers are expanded metal layers. Other features and variations of the filter assembly 100 are easily envisioned by one of skill.

FIG. 3 illustrates another representative filter assembly of the invention. Filter assembly 200 is a conical filter assembly. Conical filter assembly 200 has media pack 10 disposed within conical cartridge housing 42. Conical cartridge housing 42 has circular supporting members 43 surrounding the varying circumferences of filter assembly 200 and linear supporting members 44 traversing a portion of the length of filter assembly 200. Conical cartridge housing 42 is configured and designed to mount onto an air intake portion of an engine at first end portion 70. As such, first end portion 70 has fitting 72 that is designed for mounting onto and forming a substantially sealed connection with a specific engine air intake port (not shown). Second end portion 80 of filter assembly 200 has end cap 82 disposed thereon to substantially cover second end portion 80. FIG. 3A illustrates a cross sectional view of the conical filter assembly 200 through plane 90 to show additional detail of the interior of the filter assembly 200.

FIG. 3A shows linear supporting members 44 and media pack 10 disposed therein through cross sectional plane 90 of filter assembly 200. Media pack 10 has media layers 12 and 16. Media layer 12 is a high loft filter media layer that is disposed in touching relation to linear supporting members 44 as well as circular supporting members 43 (not shown in FIG. 3A). Media layer 16 is a low loft filter media layer that is disposed on high loft media layer 12. Media layer 16 further defines hollow section 95 of conical filter assembly 200. When attached to the air intake port of an engine during use, conical filter assembly 200 filters air by action of the air intake, wherein air is drawn between supporting members 43, 44; then through high loft media layer 12; then through low loft media layer 16; then into hollow section 95; then through first end portion 70 and into the engine air intake port.

Many alternative embodiments of filter assembly 200 will be envisioned; some or all of the various alternative embodiments described below are useful alone or in combination, depending on the particular engine configuration for which the filter assembly is to be used. The size of conical filter assembly 200 will vary depending on the particular engine configuration for which the filter assembly is to be used. The dimensions, spacing, and composition of supporting members 43, 44 are also variable. For example, in some embodiments the spacing between linear supporting members 44 ranges from about 1 cm to 6 cm; and in some embodiments the spacing between circular supporting members 43 ranges from about 2 cm to 20 cm. In some embodiments, the media pack 10 is pleated; in other embodiments the media pack 10 is not pleated. In some embodiments, supporting members 43, 44, fitting 72, and end cap 82 are composed of metal, epoxy coated metal, a synthetic thermoplastic or thermoset polymeric composition, a ceramic, or combinations or alloys of one or more thereof. In some embodiments the filter assembly is substantially cylindrical instead of conical; that is, linear supporting members 44 are substantially planar relative to one another. In some embodiments, a wire cloth, screen, or expanded metal is employed in place of support members 43, 44 in the cartridge housing. In some embodiments, an additional perforate support such as a screen, scrim, expanded metal, or mesh is further disposed within conical cartridge housing 42 between supporting members 43, 44 and high loft filter media layer 12. In some embodiments, additional supporting members or perforate support is disposed within conical cartridge housing 42 in contact with low loft filter media layer 16 such that the additional supporting members or perforate support defines hollow section 95 of conical filter assembly 200.

In some embodiments, conical filter assembly 200 is designed for engine intake air flow in a substantially opposite direction from that defined above. That is, the filter assembly is designed to have air intake proceed through first end portion 70 and into the hollow section 95, to traverse contacted filter media pack 10, exiting around support members 43, 44 and into an air intake port (not shown). In such embodiments, the arrangement of contacted filter media pack 10 is such that high loft media layer defines the hollow section 95, and the low loft media layer is disposed between the high loft media layer and support members 43 and 44. In such embodiments, first end portion 70 and second end portion 80 are suitably designed to fit within or attach to the engine air intake port as required by the particular design.

4. Description of Filter Assembly Methods of Use

The filter assemblies of the invention are useful in high velocity air filtration applications. Surprisingly, in some embodiments, a single layer of high loft filter media combined with a single layer of low loft filter media are sufficient to filter dust, sand, soot, and other debris encountered in challenging aviation applications such as helicopter inlet barrier filtration, when a media pack of the invention is arranged in a filter element. The combination of simplicity and thinness of the media pack in conjunction with the efficiency of the depth loading observed in the filter assemblies of the invention are unexpected due to the high velocity of air that traverses the filter assemblies of the invention during use. Additionally, the filter assemblies of the invention achieve high efficiency filtration of debris and solid particulates in high air velocity filtration applications in the absence of added oil. Conventional inlet barrier filters, for example helicopter engine inlet barrier filters, require application of oil to the filter media on the intake side of the filter in order to provide the necessary efficiency of filtration. The presence of oil further makes conventional filters difficult to clean; for example, it is difficult to wash with water alone due to the lower surface tension of oil covered fibers. Further, re-application of oil to the intake side of the filter after washing and drying is required prior to reuse. Finally, the effluent oil that washes off of the filter during cleaning can be an environmental concern. The filter assemblies of the invention are not limited by the need to employ oil on the filter media and therefore represent a substantial advance in high velocity air filtration, particularly in inlet barrier filtration for aviation applications such as for helicopter engines.

Because the filter assemblies of the invention are capable of high efficiency depth loading with low pressure drop at air velocities of 100 fpm or more, and further require no oiled media, they are usefully employed as inlet barrier filters for high performance engines. High performance engines include turboprop type vehicle engines; other aviation engines such as jet engines; other high speed gas turbine engines; high power diesel or gasoline engines; and the like. Rotary aircraft, such as observation, commuter, attack, or utility helicopters are examples of turboprop vehicles. Military helicopters include the UH-1, CH-46, OH-58, MH-53, and AH-64. Turboprop aircraft also include heavy lift aircraft, tilt roto aircraft such as the V-22 Osprey, the Swearingen Metro III Expeditor, and the Aerospatiale ATR 42-300; and turboprop aircraft made by Beech Commuter, General Dynamics, Convair, and the like. In inlet barrier filter applications, the filter assemblies of the invention remove airborne particulates from the air intake path of the engine and thereby extend the useful life of the engine even in harsh environments, such as desert environments where dry, airborne sand, grit, and debris are a particular problem especially for turboprop vehicles.

The filter assemblies of the invention are capable of high efficiency depth loading at air velocities of 100 fpm (about 30 m/min) or more of air through the intake side of a filter element while maintaining low pressure drop across the filter media pack; that is, high loadings of particles are filtered at high efficiency, but without plugging the filter assembly to cause significant loss of air flow into the engine. In embodiments, the filter assemblies of the invention are capable of high efficiency depth loading at air velocities of about 100 fpm to 3300 fpm (about 30 m/min-1000 m/min), or about 500 fpm to 2700 fpm (about 150 m/min to about 820 m/min) of air through the intake side of a filter element. In some embodiments, at an air flow rate of 720 fpm, the filter assemblies have an initial efficiency of about 90% to 99.99%, or about 94% to 99.9%, or about 96% to 99%. Loading capacity of the filter assemblies of the invention are recited on the basis of effective square foot area of filtration surface, that is, the surface area of the intake side of a media pack or supported media pack with any pleats therein being flattened. In embodiments, at an air flow rate of 720 fpm, the filter assemblies of the invention are capable of loading (or capturing) about 10 $g/ft^2$ to 200 $g/ft^2$ of solid particulate matter such as dust, sand, and the like per square foot of media pack intake surface area, before reaching a pressure drop of 25 in. $H_2O$; in embodiments between 20 $g/ft^2$ and 100 $g/ft^2$ at a pressure drop of 25 in. $H_2O$; and in embodiments between 40 $g/ft^2$ and 80 $g/ft^2$ at a pressure drop of 25 in. $H_2O$. In embodiments, the filter assemblies of the invention have an initial pressure drop at an air flow rate of 720 fpm, wherein initial pressure drop is defined as the pressure differential of a new or cleaned filter assembly, of about 0.2 in. $H_2O$ to 1 in. $H_2O$, in embodiments about 0.4 in $H_2O$ to 0.8 in. $H_2O$, and in embodiments about 0.5 in $H_2O$ to 0.7 in. $H_2O$.

In embodiments, cleaning of the filter assemblies of the invention is easily carried out by brushing off of debris, applying compressed air, applying water, applying water plus a cleaning additive such as a detergent, surfactant, or water miscible cosolvent, or a combination of one or more of these cleaning operations to the filter element. In some embodiments, satisfactory cleaning is accomplished by physically brushing the intake side of the filter assembly with a soft bristled brush, and/or blowing on one or both the intake and exit sides of the filter with compressed air. In some embodiments, cleaning with a brush and/or compressed air is followed by washing. In other embodiments, the filter assembly is washed without prior brushing or compressed air application. In some embodiments, washing is accomplished using clean tap water from a faucet or hose, without a nozzle; in other embodiments a nozzle is used to control water pressure. While the method of cleaning is not particularly limited, in embodiments efficient cleaning is accomplished by simply flowing water from the exit side of the filter to the intake side, that is, in the opposite direction as the directed air flow through the filter assemblies. In embodiments, it is useful to observe the effluent water during the cleaning, and when the water is substantially clear and free of debris, the filter is sufficiently cleaned to be serviceable in a subsequent reuse of the intended application.

A further advantage of the filter assemblies of the invention is that the contacted media assemblies dry quickly after water washing. Thus, a washing and drying cycle is carried out in less than 24 hours, where the washing and drying cycle is defined as the time from commencement of washing with water to the time when the filter assembly is serviceable for reuse in the intended filtration application. In some embodiments, the washing and drying cycle is about 1 minute to 10 hours, or about 5 minutes to 5 hours, or about 10 minutes to 1 hour, or about 10 minutes to 30 minutes. In some embodiments, after washing the filter assemblies are simply shaken and then set out to dry at a temperature above 0° C. and below the lowest melting point of any component of the filter assembly including the frame material, the perforate support, or any fiber or fiber component in the filter media pack. Convection or forced air flow is useful in some embodiments to speed drying of the filter assemblies. In other embodiments, the filter assembly is simply laid, stacked, or hung in a location that is sufficiently dry to allow the filter assembly to dry enough for reuse in the intended filtration application. A substantial advantage of the filter assemblies of the invention is the ability to reuse the filter assemblies of the invention in high velocity air filtration applications after cleaning without applying oil to the filter media pack.

In embodiments, the supported media assemblies and filter assemblies are sufficiently robust to withstand 2 or more use cycles, wherein a use cycle is defined as washing a used and at least partially loaded filter assembly with tap water; drying; and reusing the filter assembly to the point where washing is required. Washing is required as selected by an engine user based on criteria associated with the particular engine in use. In some embodiment the engine user selects to wash a filter assembly based on engine specifications for air intake velocity, engine temperature, elapsing of a selected number of hours of operation of the engine with the filter assembly in place, or by some other selected criterion or combination of criteria. In some embodiments, the contacted media assemblies, supported media assemblies, and filter assemblies of the invention are usable over about 2 to 100 use cycles, in some embodiments 5 to 70 use cycles, in some embodiments about 10 to 50 use cycles, in some embodiments about 15 to 25 use cycles.

An advantage of the media packs and filter assemblies of the invention is that even after many use cycles initial pressure drop, efficiency, and particle loading capacity at selected pressure drop values are not significantly deteriorated; that is, the media packs and filter assemblies of the invention are robust enough to perform nearly as well as a new filter assembly after one or more use cycles. Thus, after 15 use cycles, the measured values of pressure drop, efficiency, and particle loading capacity at 25 in. $H_2O$ change less than 10% from the same values as measured during the first use cycle, or measured values change by about 0.01% to 7%, or about 0.1% to 5%, or about 0.5% to 2% from the same values as measured during the first use cycle.

EMBODIMENTS

1. First Embodiment

A first embodiment of the invention, either alone or in combination with any other embodiment or combination of embodiments listed in this section or elsewhere herein, contemplates a filter media pack comprising a layer of a high loft filter media and a layer of a low loft filter media, the low loft media comprising a bicomponent fiber, wherein the filter media pack is capable of filtering air laden particulates from an air stream at greater than 94% efficiency at air stream flow rates of between about 100 feet per minute and 3000 feet per minute.

In any such first embodiment, either alone or in combination with any other embodiment or combination of embodiments listed herein, the filter media pack is characterized by the absence of oil added to the filter media pack. In any such first embodiment, either alone or in combination with any other embodiment or combination of embodiments listed herein, the high loft filter media comprises a nonwoven media. In any such first embodiment, either alone or in combination with any other embodiment or combination of embodiments listed herein, the high loft filter media comprises a nonwoven media having a basis weight of about 40 g/m² to 75 g/m², a thickness of 0.1 mm to 2 cm at 0.002 psi, a compressibility of about 40% to 80% between 0.002 psi and 0.3 psi, and a permeability of about 100 to 300 m/min. In any such first embodiment, either alone or in combination with any other embodiment or combination of embodiments listed herein, the low loft filter media comprises a nonwoven media. In any such first embodiment, either alone or in combination with any other embodiment or combination of embodiments listed herein, the low loft filter media comprises a nonwoven media having a thickness of about 0.1 mm to 2 mm at 0.125 psi, a compressibility of about 10% to 25% between 0.125 psi and 0.563 psi, and a permeability of about 10 to 100 m/min. In any such first embodiment, either alone or in combination with any other embodiment or combination of embodiments listed herein, the low loft filter media comprises a nonwoven media having a basis weight of about 40 g/m² to 75 g/m², a thickness of about 0.1 mm to 2 mm at 0.125 psi, a compressibility of about 10% to 25% between 0.125 psi and 0.563 psi, and a permeability of about 10 to 100 m/min. In any such first embodiment, either alone or in combination with any other embodiment or combination of embodiments listed herein, the low loft filter media has an average pore size of about 50 to 100 microns. In any such first embodiment, either alone or in combination with any other embodiment or combination of embodiments listed herein, the low loft filter media has a solidity of about 4% to 10% at 0.125 psi. In any such first embodiment, either alone or in combination with any other embodiment or combination of embodiments listed herein, the high loft filter media is a nonwoven media comprising a polyester monocomponent fiber. In any such first embodiment, either alone or in combination with any other embodiment or combination of embodiments listed herein, the low loft media is a nonwoven media comprising a bicomponent fiber. In any such first embodiment, either alone or in combination with any other embodiment or combination of embodiments listed herein, the bicomponent fiber comprises a polyester, a nylon, a polyolefin, or a combination of one or more thereof. In any such first embodiment, either alone or in combination with any other embodiment or combination of embodiments listed herein, the bicomponent fiber consists essentially of a core/sheath morphology. In any such first embodiment, either alone or in combination with any other embodiment or combination of embodiments listed herein, the low loft media further comprises a glass fiber. In any such first embodiment, either alone or in combination with any other embodiment or combination of embodiments listed herein, the low loft media comprises between about 25% and 75% by weight of the bicomponent fiber and between about 75% and 25% by weight of the glass fiber. In any such first embodiment, either alone or in combination with any other embodiment or combination of embodiments listed herein, the high loft filter media, the low loft filter media, or both comprise a gradient of one or more of permeability, pore size, fiber diameter, fiber length, fiber composition, efficiency, solidity, wettability, chemical resistance and temperature resistance throughout one or more dimensions of the media. In any such first embodiment, either alone or in combination with any other embodiment or combination of embodiments listed herein, the filter media pack is capable of filtering air laden particulates from an air stream at greater than 98% efficiency at air stream flow rate of between about 500 feet per minute to 1000 feet per minute. In any such first embodiment, either alone or in combination with any other embodiment or combination of embodiments listed herein, the filter media pack is capable of filtering air laden particulates from an air stream at greater than 99% efficiency at air stream flow rate of between about 500 feet per minute to 1000 feet per minute. In any such first embodiment, either alone or in combination with any other embodiment or combination of embodiments listed herein, the high loft filter media has a solidity of between about 0.1% to 3% at 0.002 psi. In any such first embodiment, either alone or in combination with any other embodiment or combination of embodiments listed herein, the low loft filter media has a solidity of between about 4% to 25% at 0.125 psi. In any such first embodiment, either alone or in combination with any other embodiment or combination of embodiments listed herein, the media pack has a thickness of between about 0.1 mm to 2 cm at 0.125 psi. In any such first embodiment, either alone or in combination with any other embodiment or combination of embodiments listed herein, the media pack has a basis weight of between about 25 g/m² to 500 g/m². In any such first embodiment, either alone or in combination with any other embodiment or combination of embodiments listed herein, the media pack has a permeability of between about 25 m/min to 500 m/min.

2. Second Embodiment

A second embodiment of the invention, either alone or in combination with any other embodiment or combination of embodiments listed in this section or elsewhere herein, contemplates filter media pack comprising a layer of a high loft filter media and a layer of a low loft filter media, the low loft media having a basis weight of about 40 g/m² to 75 g/m², wherein the filter media pack is capable of filtering air laden particulates from an air stream at greater than 94% efficiency at air stream flow rates of between about 100 feet per minute and 3000 feet per minute.

In any such second embodiment, either alone or in combination with any other embodiment or combination of embodiments listed herein, the filter media pack is characterized by the absence of oil added to the filter media pack. In any such second embodiment, either alone or in combination with any other embodiment or combination of embodiments listed herein, the high loft filter media comprises a nonwoven media. In any such second embodiment, either alone or in combination with any other embodiment or combination of embodiments listed herein, the high loft filter media comprises a nonwoven media having a basis weight of about 40 g/m² to 75 g/m², a thickness of 0.1 mm to 2 cm at 0.002 psi, a compressibility of about 40% to 80% between 0.002 psi and 0.3 psi, and a permeability of about 100 to 300 m/min. In any such second embodiment, either alone or in combination with any other embodiment or combination of embodiments listed herein, the low loft filter media comprises a nonwoven media. In any such second embodiment, either alone or in combination with any other embodiment or combination of embodiments listed herein, the low loft filter media comprises a nonwoven media having a thickness of about 0.1 mm to 2 mm at 0.125 psi, a compressibility of about 10% to 25% between 0.125 psi and 0.563 psi, and a permeability of about 10 to 100 m/min. In any such second embodiment, either alone or in combination with any other embodiment or combination of embodiments listed herein, the low loft filter media comprises a nonwoven media having a basis weight of about 40 g/m² to 75 g/m², a thickness of about 0.1 mm to 2 mm at 0.125 psi, a compressibility of about 10% to 25% between 0.125 psi and 0.563 psi, and a permeability of about 10 to 100 m/min. In any such second embodiment, either alone or in combination with any other embodiment or combination of embodiments listed herein, the low loft filter media has an average pore size of about 50 to 100 microns. In any such second embodiment, either alone or in combination with any other embodiment or combination of embodiments listed herein, the low loft filter media has a solidity of about 4% to 10% at 0.125 psi. In any such second embodiment, either alone or in combination with any other embodiment or combination of embodiments listed herein, the high loft filter media is a nonwoven media comprising a polyester monocomponent fiber. In any such second embodiment, either alone or in combination with any other embodiment or combination of embodiments listed herein, the low loft media is a nonwoven media comprising a bicomponent fiber. In any such second embodiment, either alone or in combination with any other embodiment or combination of embodiments listed herein, the bicomponent fiber comprises a polyester, a nylon, a polyolefin, or a combination of one or more thereof. In any such second embodiment, either alone or in combination with any other embodiment or combination of embodiments listed herein, the bicomponent fiber consists essentially of a core/sheath morphology. In any such second embodiment, either alone or in combination with any other embodiment or combination of embodiments listed herein, the low loft media further comprises a glass fiber. In any such second embodiment, either alone or in combination with any other embodiment or combination of embodiments listed herein, the low loft media comprises between about 25% and 75% by weight of the bicomponent fiber and between about 75% and 25% by weight of the glass fiber. In any such second embodiment, either alone or in combination with any other embodiment or combination of embodiments listed herein, the high loft filter media, the low loft filter media, or both comprise a gradient of one or more of permeability, pore size, fiber diameter, fiber length, fiber composition, efficiency, solidity, wettability, chemical resistance and temperature resistance throughout one or more dimensions of the media. In any such second embodiment, either alone or in combination with any other embodiment or combination of embodiments listed herein, the filter media pack is capable of filtering air laden particulates from an air stream at greater than 98% efficiency at air stream flow rate of between about 500 feet per minute to 1000 feet per minute. In any such second embodiment, either alone or in combination with any other embodiment or combination of embodiments listed herein, the filter media pack is capable of filtering air laden particulates from an air stream at greater than 99% efficiency at air stream flow rate of between about 500 feet per minute to 1000 feet per minute. In any such second embodiment, either alone or in combination with any other embodiment or combination of embodiments listed herein, the high loft filter media has a solidity of between about 0.1% to 3% at 0.002 psi. In any such second embodiment, either alone or in combination with any other embodiment or combination of embodiments listed herein, the low loft filter media has a solidity of between about 4% to 25% at 0.125 psi. In any such second embodiment, either alone or in combination with any other embodiment or combination of embodiments listed herein, the media pack has a thickness of between about 0.1 mm to 2 cm at 0.125 psi. In any such second embodiment, either alone or in combination with any other embodiment or combination of embodiments listed herein, the media pack has a basis weight of between about 25 g/m² to 500 g/m². In any such second embodiment, either alone or in combination with any other embodiment or combination of embodiments listed herein, the media pack has a permeability of between about 25 m/min to 500 m/min.

3. Third Embodiment

A third embodiment of the invention, either alone or in combination with any other embodiment or combination of embodiments listed in this section or elsewhere herein, contemplates a filter assembly comprising a cartridge housing and the filter pack of either the first embodiment or the second embodiment, either alone or in combination with any other embodiment or combination of embodiments listed herein and further listed within the First Embodiment or the Second Embodiment.

In any such third embodiment, either alone or in combination with any other embodiment or combination of embodiments listed herein, wherein the cartridge housing is a substantially planar frame defining a perimeter of the filter element. In any such third embodiment, either alone or in combination with any other embodiment or combination of embodiments listed herein, the cartridge housing is a cylindrical or conical cartridge housing having circular support members and linear support members enclosing the filter media pack, and further comprising an end cap. In any such third embodiment, either alone or in combination with any other embodiment or combination of embodiments listed herein, the cartridge housing comprises a metal, a ceramic, a thermoplastic polymer, a thermoset polymer, or an alloy, blend, or combination of one or more thereof. In any such third embodiment, either alone or in combination with any other embodiment or combination of embodiments listed herein, the filter assembly further comprises one or more perforate supports. In any such third embodiment, either alone or in combination with any other embodiment or combination of embodiments listed herein, the one or more perforate supports is a wire cloth, a coated wire cloth, an expanded metal sheet, a screen, a scrim, or a perforated sheet. In any such third embodiment, either alone or in combination with any other embodiment or combination of embodiments listed herein, the one or more perforate supports comprises a metal, a ceramic, a thermoplastic polymer, a thermoset polymer, or an alloy, blend, or combination of one or more thereof. In any such third embodiment, either alone or in combination with any other embodiment or combination of embodiments listed herein, the one or more perforate supports comprises one perforate support, wherein the one perforate support is disposed between the high loft media layer and at least a portion of the cartridge housing. In any such third embodiment, either alone or in combination with any other embodiment or combination of embodiments listed herein, the one or more perforate supports comprises one perforate support, wherein the one perforate support contacts at least the low loft media layer. In any such third embodiment, either alone or in combination with any other embodiment or combination of embodiments listed herein, the one or more perforate supports comprises a first perforate support and a second perforate support, wherein the first perforate support is disposed between the high loft media layer and at least a portion of the cartridge housing and the second perforate support contacts at least the low loft media layer. In any such third embodiment, either alone or in combination with any other embodiment or combination of embodiments listed herein, the a filter media pack, one or more of the perforate supports, or both the filter media pack and one or more of the perforate supports are pleated or fluted. In any such third embodiment, either alone or in combination with any other embodiment or combination of embodiments listed herein, the filter media pack is pleated or fluted. In any such third embodiment, either alone or in combination with any other embodiment or combination of embodiments listed herein, the cartridge housing is adapted to fit a turbine driven rotary aircraft.

4. Fourth Embodiment

A fourth embodiment of the invention, either alone or in combination with any other embodiment or combination of embodiments listed in this section or elsewhere herein, contemplates a method of filtering air, the method comprising disposing a filter assembly between an air inlet source and an engine, the filter assembly comprising a cartridge housing and the filter pack of either the first embodiment or the second embodiment, either alone or in combination with any other embodiment or combination of embodiments listed herein and further listed within the First Embodiment or the Second Embodiment; and flowing an air stream laden with solid particulates from the air inlet source through the filter assembly and into the engine, wherein the laden air stream flow rate is between about 100 feet per minute and 3000 feet per minute, and wherein the filter assembly filters solid particulates from the air inlet source at greater than 94% efficiency. In any such fourth embodiment, either alone or in combination with any other embodiment or combination of embodiments listed herein, the high loft filter media layer is disposed on the upstream side of the air inlet source. In any such fourth embodiment, either alone or in combination with any other embodiment or combination of embodiments listed herein, the laden air stream flow rate is between about 500 and 1000 feet per minute and the filter assembly filters the solid particulates from the air inlet source at greater than 98% efficiency. In any such fourth embodiment, either alone or in combination with any other embodiment or combination of embodiments listed herein, the filter assembly filters solid particulates from the air stream at greater than 99% efficiency. In any such fourth embodiment, either alone or in combination with any other embodiment or combination of embodiments listed herein, the method further comprises washing and drying the particulate laden filter assembly after the disposing and at a selected loading of particles, and repeating the disposing and flowing, wherein the combined disposing, flowing, washing, and drying constitutes one use cycle. In any such fourth embodiment, either alone or in combination with any other embodiment or combination of embodiments listed herein, the washing comprises flowing tap water through the filter assembly in a direction opposite to the direction of laden air flow through the filter element. In any such fourth embodiment, either alone or in combination with any other embodiment or combination of embodiments listed herein, the washing and drying take less than 10 hours. In any such fourth embodiment, either alone or in combination with any other embodiment or combination of embodiments listed herein, the washing and drying take less than 1 hour. In any such fourth embodiment, either alone or in combination with any other embodiment or combination of embodiments listed herein, after 2 to 100 use cycles the filter media pack is capable of filtering air laden particulates at greater than 94% efficiency at air stream flow rates of between about 100 feet per minute and 3000 feet per minute. In any such fourth embodiment, either alone or in combination with any other embodiment or combination of embodiments listed herein, after 15 use cycles the filter media pack is capable of filtering air laden particulates at greater than 94% efficiency at air stream flow rates of between about 100 feet per minute and 3000 feet per minute. In any such fourth embodiment, either alone or in combination with any other embodiment or combination of embodiments listed herein, after 15 use cycles the filter media pack is capable of filtering air laden particulates at greater than 99% efficiency at air stream flow rate of about 720 feet per minute.

5. Fifth Embodiment

A fifth embodiment of the invention, either alone or in combination with any other embodiment or combination of embodiments listed in this section or elsewhere herein, contemplates a filter media pack comprising: a single layer of a nonwoven high loft filter media, the high loft media having a solidity of about 0.1 to 3% at 0.002 psi, a basis weight of about 40 $g/m^2$ to 75 $g/m^2$, a thickness of about 0.1 mm to 2 cm at 0.002 psi, a compressibility of about 40% to 80% between 0.002 psi and 0.3 psi, and a permeability of about 100 to 300 m/min; and a single layer of a nonwoven low loft filter media, the low loft media comprising a bicomponent fiber; the filter media pack capable of filtering air laden particulates at greater than 94% efficiency at air flow rates of between about 100 feet per minute and 3000 feet per minute.

In any such fifth embodiment, either alone or in combination with any other embodiment or combination of embodiments listed herein, the filter media pack is characterized by the absence of oil added to the filter media pack. In any such fifth embodiment, either alone or in combination with any other embodiment or combination of embodiments listed herein, the low loft filter media comprises a nonwoven media having a basis weight of about 40 g/m$^2$ to 75 g/m$^2$, a thickness of about 0.1 mm to 2 cm at 0.125 psi, a compressibility of about 10% to 25% between 0.125 psi and 0.563 psi, and a permeability of about 10 to 100 m/min. In any such fifth embodiment, either alone or in combination with any other embodiment or combination of embodiments listed herein, the low loft filter media comprises a nonwoven media having a thickness of about 0.1 mm to 2 cm at 0.125 psi, a compressibility of about 10% to 25% between 0.125 psi and 0.563 psi, and a permeability of about 10 to 100 m/min. In any such fifth embodiment, either alone or in combination with any other embodiment or combination of embodiments listed herein, the low loft filter media has an average pore size of about 50 to 100 microns. In any such fifth embodiment, either alone or in combination with any other embodiment or combination of embodiments listed herein, the high loft filter media is a nonwoven media comprising a polyester monocomponent fiber. In any such fifth embodiment, either alone or in combination with any other embodiment or combination of embodiments listed herein, the low loft media comprises a bicomponent fiber. In any such fifth embodiment, either alone or in combination with any other embodiment or combination of embodiments listed herein, the bicomponent fiber comprises a polyester, a nylon, a polyolefin, or a combination of one or more thereof. In any such fifth embodiment, either alone or in combination with any other embodiment or combination of embodiments listed herein, the bicomponent fiber consists essentially of a core/sheath morphology. In any such fifth embodiment, either alone or in combination with any other embodiment or combination of embodiments listed herein, the low loft media further comprises a glass fiber. In any such fifth embodiment, either alone or in combination with any other embodiment or combination of embodiments listed herein, the low loft media comprises between about 25% and 75% by weight of the bicomponent fiber and between about 75% and 25% by weight of the glass fiber. In any such fifth embodiment, either alone or in combination with any other embodiment or combination of embodiments listed herein, the glass fiber comprises a blend of two or more sources of glass fiber. In any such fifth embodiment, either alone or in combination with any other embodiment or combination of embodiments listed herein, the filter media pack is capable of filtering air laden particulates at greater than 98% efficiency at air stream flow rates of between about 500 feet per minute and 1000 feet per minute. In any such fifth embodiment, either alone or in combination with any other embodiment or combination of embodiments listed herein, the filter media pack is capable of filtering air laden particulates at greater than 98% efficiency at air stream flow rates of between about 500 feet per minute and 1000 feet per minute. In any such fifth embodiment, either alone or in combination with any other embodiment or combination of embodiments listed herein, the high loft filter media, the low loft filter media, or both comprise a gradient of one or more of permeability, pore size, fiber diameter, fiber length, fiber composition, efficiency, solidity, wettability, chemical resistance and temperature resistance throughout one or more dimensions of the media. In any such fifth embodiment, either alone or in combination with any other embodiment or combination of embodiments listed herein, the high loft filter media has a solidity of about 0.1% to 3% at 0.002 psi. In any such fifth embodiment, either alone or in combination with any other embodiment or combination of embodiments listed herein, the low loft filter media has a solidity of about 4% to 25% at 0.125 psi. In any such fifth embodiment, either alone or in combination with any other embodiment or combination of embodiments listed herein, the media pack has a thickness of about 0.1 mm to 2 cm at 0.125 psi. In any such fifth embodiment, either alone or in combination with any other embodiment or combination of embodiments listed herein, the media pack has a basis weight of about 25 g/m$^2$ to 500 g/m$^2$. In any such fifth embodiment, either alone or in combination with any other embodiment or combination of embodiments listed herein, the media pack has a permeability of about 25 m/min to 500 m/min.

6. Sixth Embodiment

A sixth embodiment of the invention, either alone or in combination with any other embodiment or combination of embodiments listed in this section or elsewhere herein, contemplates a filter media pack comprising: a single layer of a nonwoven high loft filter media, the high loft media having a solidity of about 0.1 to 3% at 0.002 psi, a basis weight of about 40 g/m$^2$ to 75 g/m$^2$, a thickness of about 0.1 mm to 2 cm at 0.002 psi, a compressibility of about 40% to 80% between 0.002 psi and 0.3 psi, and a permeability of about 100 to 300 m/min; and a single layer of a nonwoven low loft filter media, the low loft media having a basis weight of about 40 g/m$^2$ to 75 g/m$^2$; the filter media pack capable of filtering air laden particulates at greater than 94% efficiency at air flow rates of between about 100 feet per minute and 3000 feet per minute.

In any such sixth embodiment, either alone or in combination with any other embodiment or combination of embodiments listed herein, the filter media pack is characterized by the absence of oil added to the filter media pack. In any such sixth embodiment, either alone or in combination with any other embodiment or combination of embodiments listed herein, the low loft filter media comprises a nonwoven media having a basis weight of about 40 g/m$^2$ to 75 g/m$^2$, a thickness of about 0.1 mm to 2 cm at 0.125 psi, a compressibility of about 10% to 25% between 0.125 psi and 0.563 psi, and a permeability of about 10 to 100 m/min. In any such sixth embodiment, either alone or in combination with any other embodiment or combination of embodiments listed herein, the low loft filter media comprises a nonwoven media having a thickness of about 0.1 mm to 2 cm at 0.125 psi, a compressibility of about 10% to 25% between 0.125 psi and 0.563 psi, and a permeability of about 10 to 100 m/min. In any such sixth embodiment, either alone or in combination with any other embodiment or combination of embodiments listed herein, the low loft filter media has an average pore size of about 50 to 100 microns. In any such sixth embodiment, either alone or in combination with any other embodiment or combination of embodiments listed herein, the high loft filter media is a nonwoven media comprising a polyester monocomponent fiber. In any such sixth embodiment, either alone or in combination with any other embodiment or combination of embodiments listed herein, the low loft media comprises a bicomponent fiber. In any such sixth embodiment, either alone or in combination with any other embodiment or combination of embodiments listed herein, the bicomponent fiber comprises a polyester, a nylon, a polyolefin, or a combination of one or more thereof. In any such sixth embodiment, either alone or in combination with any other embodiment or combination of embodiments listed herein, the bicomponent fiber consists essentially of a core/sheath morphology. In any such sixth embodiment, either alone or in combination with any other embodiment or combination of embodiments listed herein, the low loft media further comprises a glass fiber. In any such sixth embodiment, either alone or in combination with any other embodiment or combination of embodiments listed herein, the low loft media comprises between about 25% and 75% by weight of the bicomponent fiber and between about 75% and 25% by weight of the glass fiber. In any such sixth embodiment, either alone or in combination with any other embodiment or combination of embodiments listed herein, the glass fiber comprises a blend of two or more sources of glass fiber. In any such sixth embodiment, either alone or in combination with any other embodiment or combination of embodiments listed herein, the filter media pack is capable of filtering air laden particulates at greater than 98% efficiency at air stream flow rates of between about 500 feet per minute and 1000 feet per minute. In any such sixth embodiment, either alone or in combination with any other embodiment or combination of embodiments listed herein, the filter media pack is capable of filtering air laden particulates at greater than 98% efficiency at air stream flow rates of between about 500 feet per minute and 1000 feet per minute. In any such sixth embodiment, either alone or in combination with any other embodiment or combination of embodiments listed herein, the high loft filter media, the low loft filter media, or both comprise a gradient of one or more of permeability, pore size, fiber diameter, fiber length, fiber composition, efficiency, solidity, wettability, chemical resistance and temperature resistance throughout one or more dimensions of the media. In any such sixth embodiment, either alone or in combination with any other embodiment or combination of embodiments listed herein, the high loft filter media has a solidity of about 0.1% to 3% at 0.002 psi. In any such sixth embodiment, either alone or in combination with any other embodiment or combination of embodiments listed herein, the low loft filter media has a solidity of about 4% to 25% at 0.125 psi. In any such sixth embodiment, either alone or in combination with any other embodiment or combination of embodiments listed herein, the media pack has a thickness of about 0.1 mm to 2 cm at 0.125 psi. In any such sixth embodiment, either alone or in combination with any other embodiment or combination of embodiments listed herein, the media pack has a basis weight of about 25 g/m$^2$ to 500 g/m$^2$. In any such sixth embodiment, either alone or in combination with any other embodiment or combination of embodiments listed herein, the media pack has a permeability of about 25 m/min to 500 m/min.

7. Seventh Embodiment

A seventh embodiment of the invention, either alone or in combination with any other embodiment or combination of embodiments listed in this section or elsewhere herein, contemplates filter assembly comprising a cartridge housing and a filter media pack, the filter media pack comprising a single layer of a nonwoven high loft filter media, the high loft filter media having a basis weight of about 40 g/m$^2$ to 75 g/m$^2$, a thickness of about 0.1 mm to 2 cm at 0.002 psi, a compressibility of about 40% to 80% between 0.002 psi and 0.3 psi, and a permeability of about 100 to 300 m/min; and a single layer of a nonwoven low loft filter media, the low loft filter media comprising a bicomponent fiber, the filter media pack characterized by the absence of oil added to the filter media pack, the filter media pack capable of filtering particulates from an air stream at greater than 94% efficiency at air stream flow rates of between about 100 feet per minute and 3000 feet per minute.

In any such seventh embodiment, either alone or in combination with any other embodiment or combination of embodiments listed herein, the filter media pack characterized by the absence of oil added to the filter media pack. In any such seventh embodiment, either alone or in combination with any other embodiment or combination of embodiments listed herein, the cartridge housing is a substantially planar frame defining a perimeter of the filter element. In any such seventh embodiment, either alone or in combination with any other embodiment or combination of embodiments listed herein, the cartridge housing is a cylindrical or conical cartridge housing having circular support members and linear support members enclosing the filter media pack, and further comprising an end cap. In any such seventh embodiment, either alone or in combination with any other embodiment or combination of embodiments listed herein, the cartridge housing comprises a metal, a ceramic, a thermoplastic polymer, a thermoset polymer, or an alloy, blend, or combination of one or more thereof. In any such seventh embodiment, either alone or in combination with any other embodiment or combination of embodiments listed herein, the filter assembly further comprises one or more perforate supports. In any such seventh embodiment, either alone or in combination with any other embodiment or combination of embodiments listed herein, the one or more perforate supports is a wire cloth, a coated wire cloth, an expanded metal sheet, a screen, a scrim, or a perforated sheet. In any such seventh embodiment, either alone or in combination with any other embodiment or combination of embodiments listed herein, the one or more perforate supports comprises a metal, a ceramic, a thermoplastic polymer, a thermoset polymer, or an alloy, blend, or combination of one or more thereof. In any such seventh embodiment, either alone or in combination with any other embodiment or combination of embodiments listed herein, the one or more perforate supports comprises one perforate support, wherein the perforate support is disposed between the high loft media layer and at least a portion of the cartridge housing. In any such seventh embodiment, either alone or in combination with any other embodiment or combination of embodiments listed herein, the one or more perforate supports comprises one perforate support, wherein the perforate support contacts at least the low loft media. In any such seventh embodiment, either alone or in combination with any other embodiment or combination of embodiments listed herein, the one or more perforate supports comprises a first perforate support and a second perforate support, wherein the first perforate support is disposed between the high loft media and at least a portion of the cartridge housing and the second perforate support contacts at least the low loft media. In any such seventh embodiment, either alone or in combination with any other embodiment or combination of embodiments listed herein, the filter media pack, one or more of the perforate supports, or a combination thereof are pleated or fluted. In any such seventh embodiment, either alone or in combination with any other embodiment or combination of embodiments listed herein, the filter media pack is pleated or fluted. In any such seventh embodiment, either alone or in combination with any other embodiment or combination of embodiments listed herein, the cartridge housing is adapted to fit a turbine driven rotary aircraft.

8. Eighth Embodiment

An eighth embodiment of the invention, either alone or in combination with any other embodiment or combination of embodiments listed in this section or elsewhere herein, contemplates a filter assembly comprising a cartridge housing and a filter media pack, the filter media pack comprising a single layer of a nonwoven high loft filter media, the high loft filter media having a basis weight of about 40 g/m² to 75 g/m², a thickness of about 0.1 mm to 2 cm at 0.002 psi, a compressibility of about 40% to 80% between 0.002 psi and 0.3 psi, and a permeability of about 100 to 300 m/min; and a single layer of a nonwoven low loft filter media, the low loft filter media having a basis weight of about 40 g/m² to 75 g/m², the filter media pack capable of filtering particulates from an air stream at greater than 94% efficiency at air stream flow rates of between about 100 feet per minute and 3000 feet per minute.

In any such eighth embodiment, either alone or in combination with any other embodiment or combination of embodiments listed herein, the filter media pack characterized by the absence of oil added to the filter media pack. In any such eighth embodiment, either alone or in combination with any other embodiment or combination of embodiments listed herein, the cartridge housing is a substantially planar frame defining a perimeter of the filter element. In any such eighth embodiment, either alone or in combination with any other embodiment or combination of embodiments listed herein, the cartridge housing is a cylindrical or conical cartridge housing having circular support members and linear support members enclosing the filter media pack, and further comprising an end cap. In any such eighth embodiment, either alone or in combination with any other embodiment or combination of embodiments listed herein, the cartridge housing comprises a metal, a ceramic, a thermoplastic polymer, a thermoset polymer, or an alloy, blend, or combination of one or more thereof. In any such eighth embodiment, either alone or in combination with any other embodiment or combination of embodiments listed herein, the filter assembly further comprises one or more perforate supports. In any such eighth embodiment, either alone or in combination with any other embodiment or combination of embodiments listed herein, the one or more perforate supports is a wire cloth, a coated wire cloth, an expanded metal sheet, a screen, a scrim, or a perforated sheet. In any such eighth embodiment, either alone or in combination with any other embodiment or combination of embodiments listed herein, the one or more perforate supports comprises a metal, a ceramic, a thermoplastic polymer, a thermoset polymer, or an alloy, blend, or combination of one or more thereof. In any such eighth embodiment, either alone or in combination with any other embodiment or combination of embodiments listed herein, the one or more perforate supports comprises one perforate support, wherein the perforate support is disposed between the high loft media layer and at least a portion of the cartridge housing. In any such eighth embodiment, either alone or in combination with any other embodiment or combination of embodiments listed herein, the one or more perforate supports comprises one perforate support, wherein the perforate support contacts at least the low loft media. In any such eighth embodiment, either alone or in combination with any other embodiment or combination of embodiments listed herein, the one or more perforate supports comprises a first perforate support and a second perforate support, wherein the first perforate support is disposed between the high loft media and at least a portion of the cartridge housing and the second perforate support contacts at least the low loft media. In any such eighth embodiment, either alone or in combination with any other embodiment or combination of embodiments listed herein, the filter media pack, one or more of the perforate supports, or a combination thereof are pleated or fluted. In any such eighth embodiment, either alone or in combination with any other embodiment or combination of embodiments listed herein, the filter media pack is pleated or fluted. In any such eighth embodiment, either alone or in combination with any other embodiment or combination of embodiments listed herein, the cartridge housing is adapted to fit a turbine driven rotary aircraft.

9. Ninth Embodiment

A ninth embodiment of the invention, either alone or in combination with any other embodiment or combination of embodiments listed in this section or elsewhere herein, contemplates a method of filtering air, the method comprising: disposing a filter assembly between an air inlet source and an engine, the filter assembly comprising a cartridge housing and a filter media pack, the filter media pack comprising a single layer of a nonwoven high loft filter media, the high loft media having a basis weight of about 40 g/m² to 75 g/m², a thickness of about 0.1 mm to 2 cm at 0.002 psi, a compressibility of about 40% to 80% between 0.002 psi and 0.3 psi, and a permeability of about 100 to 300 m/min, and a single layer of a nonwoven low loft filter media, the low loft media comprising a bicomponent fiber; and flowing an air stream from the air inlet source through the filter assembly and into the engine, wherein the air stream flow rate through the filter assembly is between about 500 feet per minute and 3000 feet per minute, wherein filter assembly filters solid particulates from the air stream at greater than 94% efficiency.

In any such ninth embodiment, either alone or in combination with any other embodiment or combination of embodiments listed herein, the high loft filter media is disposed on the upstream side of the air inlet source. In any such ninth embodiment, either alone or in combination with any other embodiment or combination of embodiments listed herein, the air stream flow rate is between about 500 and 1000 feet per minute and the filter assembly filters the solid particulates from the air stream at greater than 98% efficiency. In any such ninth embodiment, either alone or in combination with any other embodiment or combination of embodiments listed herein, the filter assembly filters solid particulates from the air stream at greater than 99% efficiency. In any such ninth embodiment, either alone or in combination with any other embodiment or combination of embodiments listed herein, method further comprises washing and drying the particulate laden filter assembly after the disposing and at a selected loading of particles, and repeating the disposing and flowing, wherein the combined disposing, flowing, washing, and drying constitutes one use cycle. In any such ninth embodiment, either alone or in combination with any other embodiment or combination of embodiments listed herein, the washing comprises flowing tap water through the filter assembly in a direction opposite to the direction of the air stream flow through the filter element. In any such ninth embodiment, either alone or in combination with any other embodiment or combination of embodiments listed herein, the washing and drying take less than 10 hours. In any such ninth embodiment, either alone or in combination with any other embodiment or combination of embodiments listed herein, the washing and drying take less than 1 hour. In any such ninth embodiment, either alone or in combination with any other embodiment or combination of embodiments listed herein, after 2 to 100 use cycles the filter media pack is capable of filtering particulates from an air stream at greater than 94% efficiency at air stream flow rates of between about 100 feet per minute and 3000 feet per minute. In any such ninth embodiment, either alone or in combination with any other embodiment or combination of embodiments listed herein, after 15 use cycles the filter media pack is capable of filtering particulates from an air stream at greater than 94% efficiency at air stream flow rates of between about 100 feet per minute and 3000 feet per minute. In any such ninth embodiment, either alone or in combination with any other embodiment or combination of embodiments listed herein, after 15 use cycles the filter media pack is capable of filtering particulates from an air stream at greater than 99% efficiency at an air stream flow rate of about 720 feet per minute.

10. Tenth Embodiment

A tenth embodiment of the invention, either alone or in combination with any other embodiment or combination of embodiments listed in this section or elsewhere herein, contemplates a method of filtering air, the method comprising disposing a filter assembly between an air inlet source and an engine, the filter assembly comprising a cartridge housing and a filter media pack, the filter media pack comprising a single layer of a nonwoven high loft filter media, the high loft media having a basis weight of about 40 $g/m^2$ to 75 $g/m^2$, a thickness of about 0.1 mm to 2 cm at 0.002 psi, a compressibility of about 40% to 80% between 0.002 psi and 0.3 psi, and a permeability of about 100 to 300 m/min, and a single layer of a nonwoven low loft filter media, the low loft media having a basis weight of about 40 $g/m^2$ to 75 $g/m^2$; and flowing an air stream from the air inlet source through the filter assembly and into the engine, wherein the air stream flow rate through the filter assembly is between about 500 feet per minute and 3000 feet per minute, wherein filter assembly filters solid particulates from the air stream at greater than 94% efficiency.

In any such tenth embodiment, either alone or in combination with any other embodiment or combination of embodiments listed herein, the high loft filter media is disposed on the upstream side of the air inlet source. In any such tenth embodiment, either alone or in combination with any other embodiment or combination of embodiments listed herein, the air stream flow rate is between about 500 and 1000 feet per minute and the filter assembly filters the solid particulates from the air stream at greater than 98% efficiency. In any such tenth embodiment, either alone or in combination with any other embodiment or combination of embodiments listed herein, the filter assembly filters solid particulates from the air stream at greater than 99% efficiency. In any such tenth embodiment, either alone or in combination with any other embodiment or combination of embodiments listed herein, method further comprises washing and drying the particulate laden filter assembly after the disposing and at a selected loading of particles, and repeating the disposing and flowing, wherein the combined disposing, flowing, washing, and drying constitutes one use cycle. In any such tenth embodiment, either alone or in combination with any other embodiment or combination of embodiments listed herein, the washing comprises flowing tap water through the filter assembly in a direction opposite to the direction of the air stream flow through the filter element. In any such tenth embodiment, either alone or in combination with any other embodiment or combination of embodiments listed herein, the washing and drying take less than 10 hours. In any such tenth embodiment, either alone or in combination with any other embodiment or combination of embodiments listed herein, the washing and drying take less than 1 hour. In any such tenth embodiment, either alone or in combination with any other embodiment or combination of embodiments listed herein, after 2 to 100 use cycles the filter media pack is capable of filtering particulates from an air stream at greater than 94% efficiency at air stream flow rates of between about 100 feet per minute and 3000 feet per minute. In any such tenth embodiment, either alone or in combination with any other embodiment or combination of embodiments listed herein, after 15 use cycles the filter media pack is capable of filtering particulates from an air stream at greater than 94% efficiency at air stream flow rates of between about 100 feet per minute and 3000 feet per minute. In any such tenth embodiment, either alone or in combination with any other embodiment or combination of embodiments listed herein, after 15 use cycles the filter media pack is capable of filtering particulates from an air stream at greater than 99% efficiency at an air stream flow rate of about 720 feet per minute.

11. Eleventh Embodiment

An eleventh embodiment of the invention, either alone or in combination with any other embodiment or combination of embodiments listed in this section or elsewhere herein, contemplates a filter media pack comprising a single layer of a nonwoven high loft filter media, the high loft media comprising a nonwoven monocomponent polyester fiber, the high loft media having a basis weight of about 40 $g/m^2$ to 75 $g/m^2$, a thickness of about 0.1 mm to 2 cm at 0.002 psi, a compressibility of about 40% to 80% between 0.002 psi and 0.3 psi, a permeability of about 100 to 300 m/min, and a solidity of about 0.1% to 3% at 0.002 psi; and a single layer of a nonwoven low loft filter media, the low loft media comprising a glass fiber and a core/sheath bicomponent fiber consisting essentially of polyester, nylon, or a combination thereof, the filter media pack capable of filtering particulates from an air stream at greater than 94% efficiency at air stream flow rates of between about 100 feet per minute and 3000 feet per minute.

In any such eleventh embodiment, either alone or in combination with any other embodiment or combination of embodiments listed herein, the filter media pack characterized by the absence of oil added to the filter media pack. In any such eleventh embodiment, either alone or in combination with any other embodiment or combination of embodiments listed herein, the low loft filter media comprises a nonwoven media having a basis weight of about 40 $g/m^2$ to 75 $g/m^2$, a thickness of about 0.1 mm to 2 cm at 0.125 psi, a compressibility of about 10% to 25% between 0.125 psi and 0.563 psi, and a permeability of about 10 to 100 m/min. In any such eleventh embodiment, either alone or in combination with any other embodiment or combination of embodiments listed herein, the low loft filter media has an average pore size of about 50 to 100 microns. In any such eleventh embodiment, either alone or in combination with any other embodiment or combination of embodiments listed herein, the low loft media comprises between about 25% and 75% by weight of the bicomponent fiber and between about 75% and 25% by weight of the glass fiber. In any such eleventh embodiment, either alone or in combination with any other embodiment or combination of embodiments listed herein, the low loft media comprises between about 50% by weight of the bicomponent fiber and about 50% by weight of the glass fiber. In any such eleventh embodiment, either alone or in combination with any other embodiment or combination of embodiments listed herein, the bicomponent fiber consists essentially of polyester. In any such eleventh embodiment, either alone or in combination with any other embodiment or combination of embodiments listed herein, the bicomponent core is composed of poly(ethylene terephthalate) and the bicomponent sheath is composed of a poly(ethylene terephthalate) copolymer. In any such eleventh embodiment, either alone or in combination with any other embodiment or combination of embodiments listed herein, the glass fiber comprises a blend of two or more sources of glass fiber. In any such eleventh embodiment, either alone or in combination with any other embodiment or combination of embodiments listed herein, wherein the filter media pack is capable of filtering particulates from an air stream at greater than 98% efficiency at air stream flow rates of between about 500 feet per minute and 1000 feet per minute. In any such eleventh embodiment, either alone or in combination with any other embodiment or combination of embodiments listed herein, the filter media pack is capable of filtering particulates from an air stream at greater than 99% efficiency at air stream flow rates of between about 500 feet per minute and 1000 feet per minute. In any such eleventh embodiment, either alone or in combination with any other embodiment or combination of embodiments listed herein, the high loft filter media, the low loft filter media, or both comprise a gradient of one or more of permeability, pore size, fiber diameter, fiber length, fiber composition, efficiency, solidity, wettability, chemical resistance and temperature resistance throughout one or more dimensions of the media. In any such eleventh embodiment, either alone or in combination with any other embodiment or combination of embodiments listed herein, the low loft filter media has a solidity of about 4% to 25% at 0.125 psi. In any such eleventh embodiment, either alone or in combination with any other embodiment or combination of embodiments listed herein, the media pack has a thickness of about 0.1 mm to 2 cm at 0.125 psi. In any such eleventh embodiment, either alone or in combination with any other embodiment or combination of embodiments listed herein, the media pack has a basis weight of about 25 g/m² to 500 g/m². In any such eleventh embodiment, either alone or in combination with any other embodiment or combination of embodiments listed herein, the media pack has a permeability of about 25 m/min to 500 m/min.

12. Twelfth Embodiment

A twelfth embodiment of the invention, either alone or in combination with any other embodiment or combination of embodiments listed in this section or elsewhere herein, contemplates a filter assembly comprising a cartridge housing and a filter media pack, the filter media pack comprising a single layer of a nonwoven high loft filter media, the high loft media comprising a nonwoven monocomponent polyester fiber, the high loft media having a basis weight of about 40 g/m² to 75 g/m², a thickness of about 0.1 mm to 2 cm at 0.002 psi, a compressibility of about 40% to 80% between 0.002 psi and 0.3 psi, and a permeability of about 100 to 300 m/min, and a solidity of about 0.1% to 3% at 0.002 psi; and a single layer of a nonwoven low loft filter media, the low loft media comprising a glass fiber and a core/sheath bicomponent fiber consisting essentially of polyester, nylon, or a combination thereof; the filter media pack characterized by the absence of oil added to the filter media pack, the filter media pack capable of filtering particulates from an air stream at greater than 94% efficiency at air stream flow rates of between about 100 feet per minute and 3000 feet per minute.

In any such twelfth embodiment, either alone or in combination with any other embodiment or combination of embodiments listed herein, the cartridge housing is a substantially planar frame defining a perimeter of the filter element. In any such twelfth embodiment, either alone or in combination with any other embodiment or combination of embodiments listed herein, the cartridge housing is a cylindrical or conical cartridge housing having circular support members and linear support members enclosing the filter media pack, and further comprising an end cap. In any such twelfth embodiment, either alone or in combination with any other embodiment or combination of embodiments listed herein, the cartridge housing comprises a metal, a ceramic, a thermoplastic polymer, a thermoset polymer, or an alloy, blend, or combination of one or more thereof. In any such twelfth embodiment, either alone or in combination with any other embodiment or combination of embodiments listed herein, the filter assembly further comprises one or more perforate supports. In any such twelfth embodiment, either alone or in combination with any other embodiment or combination of embodiments listed herein, the one or more perforate supports is a wire cloth, a coated wire cloth, an expanded metal sheet, a screen, a scrim, or a perforated sheet. In any such twelfth embodiment, either alone or in combination with any other embodiment or combination of embodiments listed herein, the one or more perforate supports comprises a metal, a ceramic, a thermoplastic polymer, a thermoset polymer, or an alloy, blend, or combination of one or more thereof. In any such twelfth embodiment, either alone or in combination with any other embodiment or combination of embodiments listed herein, the one or more perforate supports comprises one perforate support, wherein the one perforate support is disposed between the high loft media and at least a portion of the cartridge housing. In any such twelfth embodiment, either alone or in combination with any other embodiment or combination of embodiments listed herein, the one or more perforate supports comprises one perforate support, wherein the one perforate support contacts at least the low loft media. In any such twelfth embodiment, either alone or in combination with any other embodiment or combination of embodiments listed herein, the one or more perforate supports comprises a first perforate support and a second perforate support, wherein the first perforate support is disposed between the high loft media and at least a portion of the cartridge housing and the second perforate support contacts at least the low loft media. In any such twelfth embodiment, either alone or in combination with any other embodiment or combination of embodiments listed herein, the filter media pack, the one or more perforate supports, or a combination thereof are pleated or fluted. In any such twelfth embodiment, either alone or in combination with any other embodiment or combination of embodiments listed herein, the filter media pack is pleated or fluted. In any such twelfth embodiment, either alone or in combination with any other embodiment or combination of embodiments listed herein, the cartridge housing is adapted to fit a turbine driven rotary aircraft.

13. Thirteenth Embodiment

A thirteenth embodiment of the invention, either alone or in combination with any other embodiment or combination of embodiments listed in this section or elsewhere herein, contemplates a method of filtering air, the method comprising: disposing a filter assembly between an air inlet source and an engine, the filter assembly comprising a cartridge housing and a filter media pack, the filter media pack comprising a single layer of a nonwoven high loft filter media, the high loft media comprising a nonwoven monocomponent polyester fiber, the high loft media having a basis weight of about 40 g/m² to 75 g/m², a thickness of about 0.1 mm to 2 cm at 0.002 psi, a compressibility of about 40% to 80% between 0.002 psi and 0.3 psi, and a permeability of about 100 to 300 m/min, and a solidity of about 0.1% to 3% at 0.002 psi; and a single layer of a nonwoven low loft filter media, the low loft media comprising a glass fiber and a core/sheath bicomponent fiber consisting essentially of polyester, nylon, or a combination thereof; and flowing an air stream from the air inlet source through the filter assembly and into the engine, wherein the air stream flow rate through the filter assembly is between about 500 feet per minute and 1000 feet per minute, wherein filter assembly filters solid particulates from the air stream at greater than 98% efficiency.

In any such thirteenth embodiment, either alone or in combination with any other embodiment or combination of embodiments listed herein, the filter media pack is characterized by the absence of oil added to the filter media pack. In any such thirteenth embodiment, either alone or in combination with any other embodiment or combination of embodiments listed herein, the high loft filter media layer is disposed on the upstream side of the air inlet source. In any such thirteenth embodiment, either alone or in combination with any other embodiment or combination of embodiments listed herein, the air stream flow rate is between about 600 and 800 feet per minute. In any such thirteenth embodiment, either alone or in combination with any other embodiment or combination of embodiments listed herein, the filter assembly filters solid particulates from the air stream at greater than 99% efficiency. In any such thirteenth embodiment, either alone or in combination with any other embodiment or combination of embodiments listed herein, the method further comprises washing and drying the particulate laden filter assembly after the disposing and at a selected loading of particles, and repeating the disposing and flowing, wherein the combined disposing, flowing, washing, and drying constitutes one use cycle. In any such thirteenth embodiment, either alone or in combination with any other embodiment or combination of embodiments listed herein, the washing comprises flowing tap water through the filter assembly in a direction opposite to the direction of the air stream. In any such thirteenth embodiment, either alone or in combination with any other embodiment or combination of embodiments listed herein, the washing and drying take less than 10 hours. In any such thirteenth embodiment, either alone or in combination with any other embodiment or combination of embodiments listed herein, the washing and drying take less than 1 hour.

In any such thirteenth embodiment, either alone or in combination with any other embodiment or combination of embodiments listed herein, after 2 to 100 use cycles the filter media pack is capable of filtering particulates from an air stream at greater than 98% efficiency at air stream flow rates of between about 500 feet per minute and 1000 feet per minute. In any such thirteenth embodiment, either alone or in combination with any other embodiment or combination of embodiments listed herein, after 15 use cycles the filter media pack is capable of filtering particulates from an air stream at greater than 98% efficiency at air stream flow rates of between about 500 feet per minute and 1000 feet per minute. In any such thirteenth embodiment, either alone or in combination with any other embodiment or combination of embodiments listed herein, after 15 use cycles the filter media pack is capable of filtering particulates from an air stream at greater than 99% efficiency at air stream flow rates of between about 600 feet per minute and 800 feet per minute.

EXPERIMENTAL SECTION

Example 1

High loft medium was EM 7558 obtained from Fiberbond Corp. of Michigan City, Ind. EM 7558 has a basis weight of about 62 g/m2, thickness of about 4.3-5.8 mm (0.002 psi pressure), and permeability of about 183 m/min.

Low loft media was formed using a wet laid process on an inclined wire former. A slurry, or furnish, was formed by dispersing 50% dry mass of Advansa 271P bicomponent fiber (2.0 denier or 14.3 μm, 6 mm fiber length; 50% by weight PET core, 50% by weight co-PET sheath; sheath melting temperature 110° C.; from E. I. Dupont Nemours, Wilmington Del.) and 50% dry mass of Lauscha B50 glass microfiber (borosilicate glass, d2 mean 2.5 μm, from Lauscha Fiber Intl. of Summerville, S.C.) in water with vigorous mixing. The slurry was applied to an inclined wire former using a multi-tank feed to form and dry the media and melt fuse the fibers. Drying and melt fusing was accomplished using can type dryers. No silicone release agent was applied to the dryer cans. The low loft media formed using this process had a basis weight of about 65 g/m2, thickness at 0.125 psi of 0.58 mm and thickness at 1.5 psi of 0.48 mm, or 17% compressibility (0.125 to 1.5 psi), and permeability of 53.3 m/min.

Wire mesh screen was obtained from Gerard Daniel & Co., Inc. of New Rochelle, N.Y. and was stainless steel type 316, having a wire diameter of 0.009 inches and 16×16 mesh. A single layer of the low loft medium and a single layer of the high loft medium were placed between two layers of the wire mesh screen. The media layers and wire screen layers were co-pleated using a blade pleater to form pleats with 1.25 in. pleat heights and three pleats per inch (ppi) spacing. The calculated effective filtration area of a 12 in.×12 in. section of the pleated combination of filter media and screen is 7.5 ft². After pleating, filter assemblies were made. The pleated combination was situated vertically, with pleats also situated vertically, into an aluminum frame and attached securely thereto using a curable liquid epoxy adhesive. The filter assembly thus formed had a 12 in.×12 in. intake side dimension, or an effective filtration area of 7.5 ft².

Nine filter assemblies were made using the procedure outlined above; the filter assemblies were labeled 1A-1I. The filtration area was 1 square foot, for an effective filtration area of 7.5 square feet.

Example 2

The filter assemblies 1A-1I were tested for initial pressure drop and initial loading efficiency. The test apparatus used to make all measurements was configured as follows. A cyclonic shaped inlet having an initial (outermost) radius of 14.5 inches and a final (innermost) radius of 6 inches was adapted to attach to a source of controlled air flow at the outermost radius portion; the innermost radius portion was attached and transitioned to a square duct having a cross sectional area of 12 in.×12 in. Measurements of incoming air flow rate were made in an upstream area of the duct, situated proximal to the cyclonic inlet. Downstream from the upstream area of the duct was a receiving area adapted to fit a 12×12 inch filter assembly as described in Example 1, such that a filter assembly within the receiving area is disposed substantially across the cross section of the duct in a manner that causes air flowing through the duct to flow through the filter element. A single deflocculator (the design of which is shown on Figure B.2, page 25 of International Standard ISO 5011:2000(E), "Inlet air cleaning equipment for internal combustion engines and compressors—Performance testing", © ISO 2000) was positioned in the test apparatus in the center of the flow stream and 20 inches upstream from the receiving area. Measurements of air flow rate leaving the receiving area were made in a downstream area of the duct situated proximal to the receiving area. Further downstream from the downstream area was a transition to a circular outlet having a diameter of 10 inches.

The filter assemblies 1A-1I were mounted in the test apparatus one at a time and subjected to testing using the protocol set forth in ISO 5011:2000(E) for single-stage filters as applicable except where noted otherwise herein. In all tests, the high loft filter media layer was situated on the upstream side in the test apparatus.

Pressure drop (differential pressure test), expressed as ΔP in units of inches of $H_2O$, was measured at the following rates of flow through the test apparatus, in fpm (m/min): 123 (37.5), 238 (72.5), 359 (109.4), 483 (147.2), 597 (182), 720 (219.5), 838 (255.4), and 956 (291.4). Table 1 shows the values of pressure drop measured at 720 fpm.

Efficiency (%) was measured by feeding ISO Fine Dust (as defined in ISO 5011:2000(E)) at a rate of 0.2 g/m³ per minute and an air flow rate of 720, corresponding to 20.39 scmm (scmm is standard cubic meter per minute, where "standard cubic meter" means a cubic meter of gas at atmospheric pressure of 1.01325 bar and a temperature of 15° C.) throughout the testing. Dust concentration was 0.0056 g/fpm. Dust was fed at a total amount of about 4.1 g/min. Initial efficiency measurements were taken after feeding the first approximately 20 g of dust. Efficiency measurements were further calculated after sufficient dust loading caused a 12 in. $H_2O$ terminal pressure drop (expressed as % at ΔP=12 in. $H_2O$) and again at ΔP=25 in. $H_2O$.

Table 1 shows the initial pressure drop and efficiency values as measured for filter assemblies 1A-1I.

TABLE 1

Average initial pressure drop and efficiency values for filter assemblies 1A-1I.

| Filter Element | Initial ΔP, in. $H_2O$ | Dust fed at ΔP = 12 in. $H_2O$ | | Dust fed at ΔP = 25 in. $H_2O$ | | % Efficiency | | |
|---|---|---|---|---|---|---|---|---|
| | | Total g | g/ft² | Total g | g/ft² | Initial | at ΔP = 12 in. $H_2O$ | at ΔP = 25 in. $H_2O$ |
| 1A | 0.6 | 281.1 | 37.5 | 459.5 | 61.27 | 98.59 | 99.71 | 99.6 |
| 1B | 0.7 | 278.1 | 37.1 | 461.8 | 61.57 | 98.63 | 99.74 | 99.7 |
| 1C | 0.6 | 302.6 | 40.3 | 481.7 | 64.23 | 98.59 | 99.75 | 99.6 |
| 1D | 0.7 | 251.2 | 33.5 | 427.3 | 56.97 | 98.65 | 99.67 | 99.4 |
| 1E | 0.7 | 265.5 | 35.4 | 450.7 | 60.09 | 98.78 | 99.69 | 99.4 |
| 1F | 0.7 | 246.9 | 32.9 | 433.9 | 57.85 | 99.00 | 99.71 | 99.4 |
| 1G | 0.6 | 261.4 | 34.9 | 476.9 | 63.59 | 98.31 | 99.58 | 98.9 |
| 1H | 0.7 | 263.3 | 35.1 | 455.3 | 60.71 | 98.03 | 99.58 | 99.2 |
| 1I | 0.7 | 257.5 | 34.3 | 469.2 | 62.56 | 98.45 | 99.50 | 98.7 |

Example 3

Three filter assemblies were formed and assembled as described in Example 1. The filter assemblies were labeled 2A, 2B, and 2C and were subjected to use cycle testing. In each use cycle, a filter assembly was loaded with dust as described in Example 2, with a thorough washing of each element between each loading. Washing was accomplished by rinsing the filter assemblies in a sink using tap water; the water was flowed from exit side to intake side and was continued until the effluent was observed to be clear. The wet filter assembly was then set over a bucket to drip dry until dripping stopped. Then the filter assembly was weighed, and mounted in the test apparatus with airflow was set to 720 fpm. The filter assembly was removed every 15 minutes and reweighed. These steps were repeated until the weight of the filter assembly was observed to stop changing. In general, two to five repetitions were required to reach a constant weight.

Using the procedures described in Example 2 and at 720 fpm as described in Example 2, initial pressure drop, initial efficiency, efficiency at 12 in. $H_2O$ pressure drop, and efficiency at 25 in. $H_2O$ pressure drop were after each loading, cleaning, and drying cycle. In each use cycle the filter assembly was washed after measurements at 25 in. $H_2O$ were completed. Table 2 shows loading capacity, per filter assembly in grams of dust loaded at 25 in. $H_2O$, and efficiency values calculated for filter assemblies of 3A-3C over each of 15 use cycles. The first set of values, that is, measurements for Use Cycle #1, were made using previously unused filter assemblies.

TABLE 2

Initial pressure drop, weight gained by filter assemblies at 25 in. pressure drop, and % efficiency measurements for the filter assemblies 2A-2C at 720 fpm over 15 use cycles.

| Filter Element | Use Cycle # | Initial Pressure Drop, in. $H_2O$ | Filter assembly wgt. gain, g @ 25 in. $H_2O$ | % Efficiency | | |
|---|---|---|---|---|---|---|
| | | | | Initial | At 12 in. $H_2O$ | At 25 in. $H_2O$ |
| 2A | 1 | 0.64 | 453.6 | 98.59 | 99.71 | 99.6 |
| | 2 | 0.64 | 429.7 | | 99.71 | 99.62 |
| | 3 | 0.72 | 413.3 | | 99.67 | 99.53 |

TABLE 2-continued

Initial pressure drop, weight gained by filter assemblies at 25 in. pressure drop, and % efficiency measurements for the filter assemblies 2A-2C at 720 fpm over 15 use cycles.

| Filter Element | Use Cycle # | Initial Pressure Drop, in. $H_2O$ | Filter assembly wgt. gain, g @ 25 in. $H_2O$ | % Efficiency | | |
|---|---|---|---|---|---|---|
| | | | | Initial | At 12 in. $H_2O$ | At 25 in. $H_2O$ |
| | 4 | 0.60 | 437.2 | | 99.68 | 99.64 |
| | 5 | 0.60 | 443 | | 99.73 | 99.71 |
| | 6 | 0.56 | 452.1 | | 99.69 | 99.63 |
| | 7 | 0.60 | 437 | | 99.73 | 99.7 |
| | 8 | 0.60 | 427.6 | | 99.72 | 99.71 |
| | 9 | 0.56 | 432.8 | | 99.73 | 99.64 |
| | 10 | 0.64 | 431.6 | | 99.7 | 99.68 |
| | 11 | 0.60 | 430.6 | | 99.72 | 99.67 |
| | 12 | 0.64 | 437.2 | | 99.7 | 99.6 |
| | 13 | 0.68 | 430.8 | | 99.67 | 99.62 |
| | 14 | 0.60 | 415.9 | | 99.66 | 99.65 |
| | 15 | 0.60 | 424.4 | | 99.66 | 99.66 |
| 2B | 1 | 0.72 | 456.8 | 98.63 | 99.74 | 99.66 |

TABLE 2-continued

Initial pressure drop, weight gained by filter assemblies at 25 in. pressure drop, and % efficiency measurements for the filter assemblies 2A-2C at 720 fpm over 15 use cycles.

| Filter Element | Use Cycle # | Initial Pressure Drop, in. $H_2O$ | Filter assembly wgt. gain, g @ 25 in. $H_2O$ | % Efficiency Initial | At 12 in. $H_2O$ | At 25 in. $H_2O$ |
|---|---|---|---|---|---|---|
|    | 2  | 0.68 | 431.9 |       | 99.68 | 99.59 |
|    | 3  | 0.72 | 410.9 |       | 99.64 | 99.53 |
|    | 4  | 0.60 | 449.1 |       | 99.66 | 99.61 |
|    | 5  | 0.60 | 445.1 |       | 99.72 | 99.7  |
|    | 6  | 0.56 | 446.3 |       | 99.74 | 99.7  |
|    | 7  | 0.60 | 438.8 |       | 99.72 | 99.68 |
|    | 8  | 0.56 | 445.2 |       | 99.73 | 99.69 |
|    | 9  | 0.56 | 431.5 |       | 99.7  | 99.69 |
|    | 10 | 0.60 | 443.4 |       | 99.7  | 99.64 |
|    | 11 | 0.68 | 438.2 |       | 99.7  | 99.66 |
|    | 12 | 0.64 | 447.6 |       | 99.69 | 99.42 |
|    | 13 | 0.64 | 435.7 |       | 99.68 | 99.61 |
|    | 14 | 0.60 | 426.3 |       | 99.67 | 99.67 |
|    | 15 | 0.64 | 428.7 |       | 99.66 | 99.62 |
| 2C | 1  | 0.60 | 473.4 | 98.59 | 99.75 | 99.61 |
|    | 2  | 0.64 | 452.8 |       | 99.67 | 99.56 |
|    | 3  | 0.68 | 438   |       | 99.63 | 99.54 |
|    | 4  | 0.60 | 484.6 |       | 99.7  | 99.63 |
|    | 5  | 0.56 | 471.4 |       | 99.7  | 99.56 |
|    | 6  | 0.56 | 458.5 |       | 99.72 | 99.71 |
|    | 7  | 0.56 | 461.2 |       | 99.71 | 99.67 |
|    | 8  | 0.52 | 446.1 |       | 99.69 | 99.61 |
|    | 9  | 0.52 | 470.9 |       | 99.7  | 99.65 |
|    | 10 | 0.56 | 465.9 |       | 99.7  | 99.64 |
|    | 11 | 0.60 | 473.1 |       | 99.69 | 99.62 |
|    | 12 | 0.60 | 454.4 |       | 99.89 | 99.75 |
|    | 13 | 0.64 | 458.3 |       | 99.67 | 99.61 |
|    | 14 | 0.56 | 448.6 |       | 99.66 | 99.65 |
|    | 15 | 0.60 | 459.5 |       | 99.65 | 99.6  |

Example 4

Nine filter assemblies were formed and assembled according to the procedure described in Example 1. The filter assemblies were labeled 3A-3I. Filter assemblies 3A-3I were subjected to the same procedure as described in Example 2, except that all measurements were made at 2700 fpm instead of 720 fpm. The dust feed rate was 15.3 g/min. The resulting values measured are shown in Table 3.

TABLE 3

Average initial pressure drop and efficiency values for filter assemblies 3A-3I.

| Filter Element | Initial ΔP, in. $H_2O$ | Dust fed at ΔP = 12 in. $H_2O$ Total g | g/ft² | Dust fed at ΔP = 25 in. $H_2O$ Total g | g/ft² | % Efficiency Initial | at ΔP = 12 in. $H_2O$ | at ΔP = 25 in. $H_2O$ |
|---|---|---|---|---|---|---|---|---|
| 3A | 5.57 | 129.6 | 17.3 | 216.9 | 28.9 | 91.26 | 97.07 | 96.75 |
| 3B | 5.53 | 134.2 | 17.9 | 230.7 | 30.8 | 91.09 | 95.92 | 96.29 |
| 3C | 5.41 | 135.9 | 18.1 | 226.2 | 30.2 | 90.85 | 96.34 | 96.49 |
| 3D | 5.28 | 138.1 | 18.4 | 235   | 31.3 | 92.24 | 96.36 | 96.35 |
| 3E | 5.66 | 146.2 | 19.5 | 251.2 | 33.5 | 90.95 | 96.33 | 96.60 |
| 3F | 5.30 | 137.2 | 18.3 | 226.6 | 30.2 | 90.73 | 96.57 | 96.17 |
| 3G | 5.71 | 151.7 | 20.2 | 232.3 | 31   | 90.90 | 95.84 | 95.48 |
| 3H | 5.37 | 153.9 | 20.5 | 259.1 | 34.5 | 89.95 | 95.50 | 95.00 |
| 3I | 5.49 | 152.3 | 20.3 | 254.3 | 33.9 | 91.09 | 95.80 | 95.68 |

Example 5

Three filter assemblies were formed and assembled according to the procedure described in Example 1. The filter assemblies were labeled 4A-4C. Filter assemblies 4A-4C were subjected to the same procedure as described in Example 3, except that all measurements were made at 2700 fpm instead of 720 fpm. The dust feed rate was 15.3 g/min. The resulting values measured are shown in Table 4.

TABLE 4

Initial pressure drop, weight gained by filter assemblies at 25 in. pressure drop, and % efficiency measurements for the filter assemblies 4A-4C at 2700 fpm.

| Filter Element | Use Cycle | Initial Pressure Drop, in. $H_2O$ | Filter assembly wgt. gain, g @ 25 in. $H_2O$ | % Efficiency Initial | At 12 in. $H_2O$ | At 25in. $H_2O$ |
|---|---|---|---|---|---|---|
| 4A | 1  | 5.57 | 211.5 | 91.26 | 97.44 | 97.02 |
|    | 2  | 5.66 | 214.4 |       | 96.92 | 96.99 |
|    | 3  | 5.57 | 204.8 |       | 96.72 | 96.57 |
|    | 4  | 5.75 | 192.7 |       | 95.46 | 95.89 |
|    | 5  | 5.62 | 195.6 |       | 95.88 | 95.94 |
|    | 6  | 5.79 | 197.5 |       | 95.63 | 96.37 |
|    | 7  | 5.69 | 188.4 |       | 96.67 | 96.63 |
|    | 8  | 5.72 | 192.7 |       | 96.62 | 96.91 |
|    | 9  | 5.82 | 191.8 |       | 96.04 | 96.29 |
|    | 10 | 5.83 | 183.8 |       | 96.67 | 97.05 |
|    | 11 | 5.9  | 184.4 |       | 96.03 | 96.46 |
|    | 12 | 6.08 | 169.3 |       | 96.75 | 97.01 |
|    | 13 | 5.86 | 175.5 |       | 96.17 | 96.38 |
|    | 14 | 5.84 | 186   |       | 96.43 | 97.16 |
|    | 15 | 5.9  | 189.3 |       | 96.38 | 96.72 |
| 4B | 1  | 5.53 | 223.2 | 91.09 | 96.43 | 96.58 |
|    | 2  | 5.65 | 219.4 |       | 95.83 | 96.19 |
|    | 3  | 5.66 | 205.5 |       | 94.95 | 95.61 |
|    | 4  | 5.72 | 202.6 |       | 95.22 | 95.89 |
|    | 5  | 5.77 | 199.3 |       | 95.10 | 95.60 |
|    | 6  | 5.8  | 192.4 |       | 95.08 | 95.92 |
|    | 7  | 5.8  | 189.3 |       | 95.94 | 96.25 |
|    | 8  | 6.01 | 195   |       | 95.86 | 96.29 |
|    | 9  | 5.97 | 186.9 |       | 95.48 | 96.07 |
|    | 10 | 5.83 | 195.4 |       | 96.35 | 97.10 |
|    | 11 | 5.81 | 188.5 |       | 94.96 | 95.97 |
|    | 12 | 5.98 | 171.7 |       | 96.02 | 96.33 |
|    | 13 | 5.89 | 174.5 |       | 94.95 | 96.03 |
|    | 14 | 5.99 | 185.1 |       | 96.19 | 96.41 |
|    | 15 | 5.94 | 174.6 |       | 96.17 | 96.90 |
| 4C | 1  | 5.41 | 221.2 | 90.85 | 96.80 | 96.77 |
|    | 2  | 5.5  | 220.9 |       | 96.47 | 96.34 |
|    | 3  | 5.6  | 205.7 |       | 95.67 | 95.62 |

TABLE 4-continued

Initial pressure drop, weight gained by filter assemblies at 25 in. pressure drop, and % efficiency measurements for the filter assemblies 4A-4C at 2700 fpm.

| Filter Element | Use Cycle | Initial Pressure Drop, in. H$_2$O | Filter assembly wgt. gain, g @ 25 in. H$_2$O | Initial | % Efficiency At 12 in. H$_2$O | At 25in. H$_2$O |
|---|---|---|---|---|---|---|
| | 4 | 5.54 | 209.7 | | 96.39 | 96.75 |
| | 5 | 5.75 | 207.4 | | 95.64 | 96.45 |
| | 6 | 5.67 | 205.4 | | 95.36 | 95.95 |
| | 7 | 5.66 | 211.9 | | 96.21 | 97.10 |
| | 8 | 5.66 | 198.5 | | 96.14 | 96.79 |
| | 9 | 5.65 | 193.7 | | 95.65 | 95.83 |
| | 10 | 5.77 | 202.6 | | 96.08 | 96.64 |
| | 11 | 5.76 | 200.4 | | 94.74 | 95.46 |
| | 12 | 5.82 | 186.7 | | 96.63 | 96.80 |
| | 13 | 5.81 | 195 | | 96.77 | 97.10 |
| | 14 | 5.81 | 191.6 | | 96.70 | 97.11 |
| | 15 | 5.75 | 191.5 | | 96.68 | 96.82 |

The present invention may suitably comprise, consist of, or consist essentially of, any of the disclosed or recited elements. The invention illustratively disclosed herein can be suitably practiced in the absence of any element which is not specifically disclosed herein. The various embodiments described above are provided by way of illustration only and should not be construed to limit the claims attached hereto. It will be recognized that various modifications and changes may be made without following the example embodiments and applications illustrated and described herein, and without departing from the true spirit and scope of the following claims.

We claim:

1. A filter media pack comprising a layer of a high loft nonwoven filter media and a layer of a low loft nonwoven filter media, the low loft media comprising bicomponent fiber, wherein the filter media pack is capable of filtering air laden particulates from an air stream at greater than 94% efficiency at air stream flow rates of between about 100 feet per minute and 3000 feet per minute.

2. The filter media pack of claim 1 wherein the filter media pack is characterized by the absence of oil added to the filter media pack.

3. The filter media pack of claim 1 wherein the high loft filter media comprises a nonwoven media having a basis weight of between about 40 g/m$^2$ to 75 g/m$^2$, a thickness of between about 0.1 mm to 2 cm at 0.002 psi, a compressibility of between about 40% to 80% between 0.002 psi and 0.3 psi, and a permeability of between about 100 to 300 m/min.

4. The filter media pack of claim 1 wherein the low loft filter media comprises a nonwoven media having a basis weight of between about 40 g/m$^2$ to 75 g/m$^2$, a thickness of between about 0.1 mm to 2 mm at 0.125 psi, a compressibility of between about 10% to 25% between 0.125 psi and 0.563 psi, and a permeability of between about 10 to 100 m/min.

5. The filter media pack of claim 1 wherein the low loft filter media has an average pore size of between about 50 to 100 microns and a solidity of about 4% to 10% at 0.125 psi.

6. The filter media pack of claim 1 wherein the high loft filter media is a nonwoven media comprising a polyester monocomponent fiber.

7. The filter media pack of claim 1 wherein the bicomponent fiber comprises a polyester, a nylon, a polyolefin, or a combination of one or more thereof.

8. The filter media pack of claim 1 wherein the low loft media further comprises a glass fiber.

9. The filter media pack of claim 8 wherein the low loft media comprises between about 25% and 75% by weight of the bicomponent fiber and between about 75% and 25% by weight of the glass fiber.

10. The filter media pack of claim 1 wherein the high loft filter media, the low loft filter media, or both comprise a gradient of one or more of permeability, pore size, fiber diameter, fiber length, fiber composition, efficiency, solidity, wettability, chemical resistance and temperature resistance throughout one or more dimensions of the media.

11. A filter assembly comprising
a) a cartridge housing; and
b) the filter media pack of claim 1.

12. The filter assembly of claim 11 further comprising one or more perforate supports.

13. The filter assembly of claim 12 wherein the one or more perforate supports comprises one perforate support, wherein the one perforate support is disposed between the high loft media layer and at least a portion of the cartridge housing.

14. The filter assembly of claim 12 wherein the one or more perforate supports comprises a first perforate support and a second perforate support, wherein the first perforate support is disposed between the high loft media layer and at least a portion of the cartridge housing and the second perforate support contacts at least the low loft media layer.

15. The filter assembly of claim 12 wherein the filter media pack, one or more of the perforate supports, or both the filter media pack and one or more of the perforate supports are pleated or fluted.

16. A method of filtering air, the method comprising
a) disposing a filter assembly of claim 6 between an air inlet source and an engine,
b) flowing an air stream laden with solid particulates from the air inlet source through the filter assembly and into the engine, wherein the laden air stream flow rate is between about 100 feet per minute and 3000 feet per minute, wherein the filter assembly filters solid particulates from the air inlet source at greater than 94% efficiency.

17. The method of claim 16 wherein the high loft filter media layer is disposed on the upstream side of the air inlet source.

18. The method of claim 16 further comprising washing and drying the particulate laden filter assembly after the disposing and at a selected loading of particles, and repeating the disposing and flowing, wherein the combined disposing, flowing, washing, and drying constitutes one use cycle.

19. The method of claim 18 wherein the washing comprises flowing tap water through the filter assembly in a direction opposite to the direction of laden air flow through the filter element.

20. The method of claim 18 wherein after 2 to 100 use cycles the filter media pack is capable of filtering air laden particulates at greater than 94% efficiency at air stream flow rates of between about 100 feet per minute and 3000 feet per minute.

* * * * *